US012633071B2

(12) United States Patent
Odamaki et al.

(10) Patent No.: US 12,633,071 B2
(45) Date of Patent: May 19, 2026

(54) IMAGE PROCESSING METHOD, RECORDING MEDIUM, AND IMAGE PROCESSING SYSTEM

(71) Applicants: Makoto Odamaki, Kanagawa (JP); Hiroshi Suitoh, Kanagawa (JP); Yusuke Fukuoka, Tokyo (JP)

(72) Inventors: Makoto Odamaki, Kanagawa (JP); Hiroshi Suitoh, Kanagawa (JP); Yusuke Fukuoka, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/024,288

(22) PCT Filed: Oct. 14, 2021

(86) PCT No.: PCT/IB2021/059431
§ 371 (c)(1),
(2) Date: Mar. 2, 2023

(87) PCT Pub. No.: WO2022/101707
PCT Pub. Date: May 19, 2022

(65) Prior Publication Data
US 2023/0334803 A1      Oct. 19, 2023

(30) Foreign Application Priority Data

Nov. 11, 2020    (JP) ................................. 2020-187839

(51) Int. Cl.
*G06T 19/20*      (2011.01)
*G06T 7/60*      (2017.01)
(Continued)

(52) U.S. Cl.
CPC ................ *G06T 19/20* (2013.01); *G06T 7/60* (2013.01); *G06T 7/70* (2017.01); *G06V 10/764* (2022.01);
(Continued)

(58) Field of Classification Search
CPC .. G06T 19/20; G06T 7/60; G06T 7/70; G06T 2207/20212; G06T 2210/04;
(Continued)

(56) References Cited

U.S. PATENT DOCUMENTS 10,587,864 B2 *  3/2020  Hayasaka .......... G06Q 30/0643
11,367,250 B2 *  6/2022  Totty ....................... G06T 19/20
(Continued)

FOREIGN PATENT DOCUMENTS

JP        2000-030084        1/2000
JP        2001249633 A      9/2001
(Continued)

OTHER PUBLICATIONS

International Search Report issued on Dec. 23, 2021 in PCT/IB2021/059431 filed on Oct. 14, 2021, 10 pages.
(Continued)

*Primary Examiner* — Sheree N Brown
(74) *Attorney, Agent, or Firm* — XSENSUS LLP

(57)      ABSTRACT
An image processing method to be executed by an image processing system includes: estimating a structure of a space inside a construction from a background image in which the space is imaged in all directions; estimating a region in which a virtual object is allowed to be arranged in the space based on the estimated structure; and combining the virtual object with the background image in the estimated region.

18 Claims, 39 Drawing Sheets

(51) Int. Cl.
   *G06T 7/70*       (2017.01)
   *G06V 10/764*    (2022.01)
(52) U.S. Cl.
   CPC .............. *G06T 2207/20212* (2013.01); *G06T 2210/04* (2013.01); *G06T 2219/2004* (2013.01); *G06T 2219/2012* (2013.01)
(58) Field of Classification Search
   CPC ..... G06T 2219/2004; G06T 2219/2012; G06T 19/006; G06V 10/764; G06V 10/147; G06V 10/243; G06V 20/20
   USPC ......................................................... 345/419
   See application file for complete search history.

(56)            References Cited

U.S. PATENT DOCUMENTS

| | | | | |
|---|---|---|---|---|
| 11,523,246 | B2 * | 12/2022 | Koga ........................ | H04S 7/40 |
| 2002/0154070 | A1 * | 10/2002 | Sato ........................ | H04N 5/222 |
| | | | | 348/E5.022 |
| 2008/0159650 | A1 | 7/2008 | Odamaki | |
| 2011/0196764 | A1 * | 8/2011 | Bell, Jr. ................. | G06Q 30/02 |
| | | | | 705/40 |
| 2011/0222121 | A1 | 9/2011 | Odamaki | |
| 2016/0381348 | A1 * | 12/2016 | Hayasaka ................. | G06T 1/20 |
| | | | | 348/48 |
| 2017/0243406 | A1 | 8/2017 | Yamazaki | |
| 2018/0061127 | A1 * | 3/2018 | Gullicksen ............ | G06F 3/0482 |
| 2018/0107886 | A1 | 4/2018 | Inamoto et al. | |
| 2018/0270417 | A1 | 9/2018 | Suitoh et al. | |
| 2019/0068955 | A1 * | 2/2019 | Nakazato ............. | H04N 13/117 |
| 2019/0156552 | A1 * | 5/2019 | Han .......................... | G06T 5/70 |
| 2019/0289203 | A1 | 9/2019 | Suitoh et al. | |
| 2019/0289206 | A1 | 9/2019 | Kawaguchi et al. | |
| 2019/0295216 | A1 | 9/2019 | Suitoh | |
| 2019/0306420 | A1 | 10/2019 | Okaki et al. | |
| 2019/0340737 | A1 | 11/2019 | Kawaguchi et al. | |
| 2019/0347766 | A1 | 11/2019 | Kawaguchi et al. | |
| 2019/0347775 | A1 | 11/2019 | Suitoh et al. | |
| 2020/0137375 | A1 | 4/2020 | Kroon et al. | |
| 2020/0202500 | A1 | 6/2020 | Suitoh | |
| 2020/0236277 | A1 | 7/2020 | Odamaki et al. | |
| 2020/0302681 | A1 * | 9/2020 | Totty ......................... | G06T 7/74 |
| 2021/0090210 | A1 | 3/2021 | Suitoh et al. | |
| 2021/0281966 | A1 * | 9/2021 | Koga .................. | G06F 3/04842 |
| 2022/0321796 | A1 | 10/2022 | Torii et al. | |

FOREIGN PATENT DOCUMENTS

| | | |
|---|---|---|
| JP | 2002-165094 | 6/2002 |
| JP | 2002-335401 | 11/2002 |
| JP | 2003-283829 | 10/2003 |
| JP | 2004-005513 A | 1/2004 |
| JP | 2004-088286 | 3/2004 |
| JP | 2006-252356 | 9/2006 |
| JP | 2008-165381 | 7/2008 |
| JP | 2008-236101 | 10/2008 |
| JP | 2010-219966 | 9/2010 |
| JP | 2010-238096 A | 10/2010 |
| JP | 2011-010274 | 1/2011 |
| JP | 2011-191903 | 9/2011 |
| JP | 2014-161079 | 9/2014 |
| JP | 2016085695 A | 5/2016 |
| JP | 2016-194784 | 11/2016 |
| JP | 2016-218547 A | 12/2016 |
| JP | 2018-063698 | 4/2018 |
| JP | 2018-081548 | 5/2018 |
| JP | 2018-109971 | 7/2018 |
| JP | 2018-157538 | 10/2018 |
| JP | 2018-198064 | 12/2018 |
| JP | 2019-057264 | 4/2019 |
| JP | 2019-057903 | 4/2019 |
| JP | 2019-075766 | 5/2019 |
| JP | 2019-087984 | 6/2019 |
| JP | 2019-164782 | 9/2019 |
| JP | 2019-164783 | 9/2019 |
| JP | 2019-175446 | 10/2019 |
| JP | 2019-185757 | 10/2019 |
| JP | 2020-102182 | 7/2020 |
| JP | 2020-525902 A | 8/2020 |
| JP | 2020-170526 | 10/2020 |
| JP | 2021-047796 | 3/2021 |
| JP | 2021-051593 | 4/2021 |
| JP | 2021103363 A | 7/2021 |
| JP | 2021163254 A | 10/2021 |
| WO | WO 2019/088273 A1 | 5/2019 |
| WO | 2020054203 A1 | 3/2020 |

OTHER PUBLICATIONS

Office Action issued Jul. 30, 2024 in Japanese Patent Application No. 2020-187839, 14 pages.
Office Action issued Feb. 18, 2025 in corresponding Japanese Patent Application No. 2020-187839.
Publication Submission Paper submitted by a third party to the Japanese Patent Office for corresponding Japanese Patent Application No. 2020-187839, mailed on Feb. 12, 2025.
Japanese Notice of Dispatch of Duplicates of a Written Opposition dated Feb. 3, 2026 in Japanese Patent No. 7703838. (57 pgs).

* cited by examiner

FIG. 4A
FIG. 4B
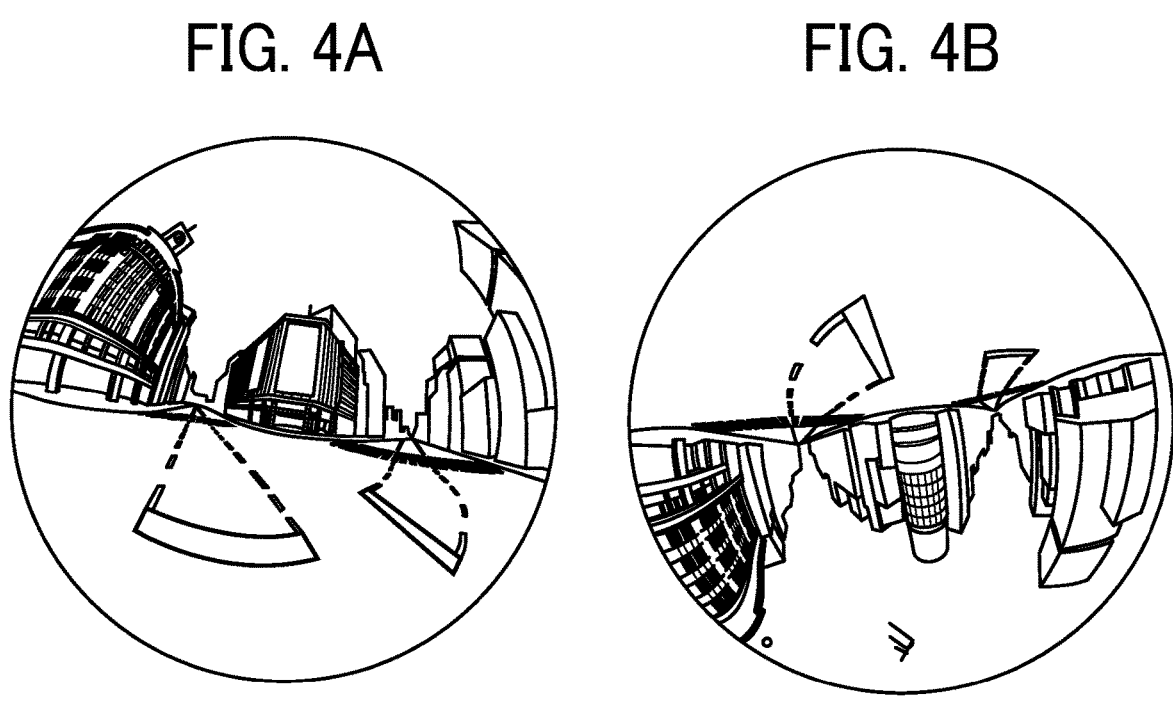
HEMISPHERICAL IMAGE (FRONT)          HEMISPHERICAL IMAGE (BACK)
FIG. 4C
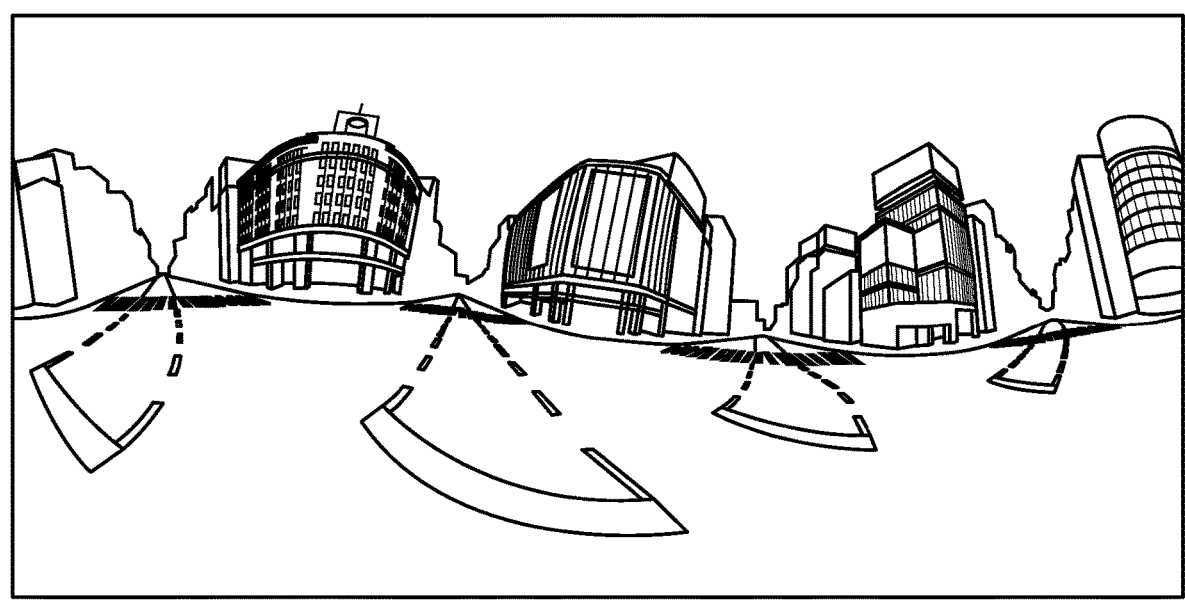
CAPTURED IMAGE (EQUIDISTANT CYLINDRICAL PROJECTION IMAGE EC)

FIG. 5A
FIG. 5B
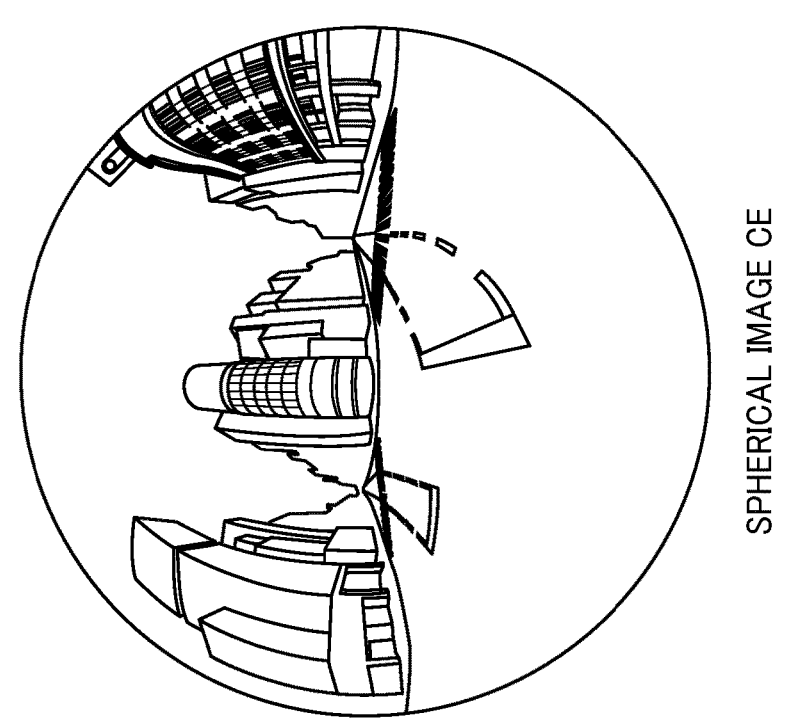
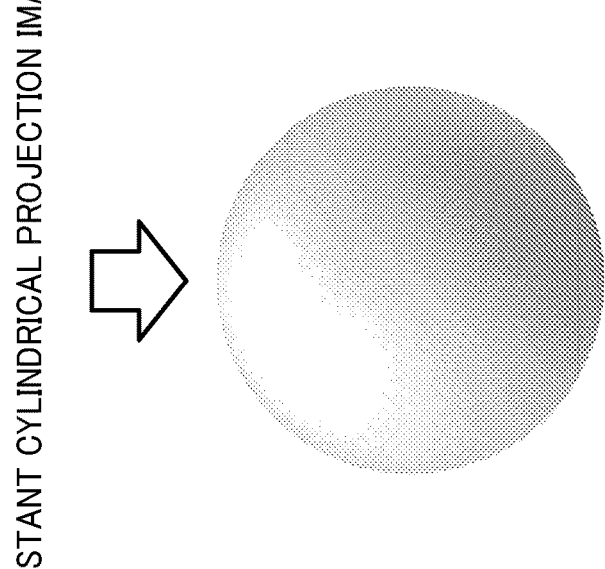
EQUIDISTANT CYLINDRICAL PROJECTION IMAGE EC
SPHERICAL IMAGE CE

FIG. 7

PREDETERMINED REGION T

CENTER POINT CP (x, y)

DIAGONAL LINE 2L

DISTANCE f $\alpha$ $\alpha/2$ aa ea

VIRTUAL CAMERA IC

IMAGE PROCESSING DEVICE 10 (IMAGE DISTRIBUTION DEVICE 30, DISPLAY DEVICE 90)

FIG. 14

| IMAGE ID | CONDITION ID | CAPTURED IMAGE DATA | PROCESSED IMAGE DATA |
|---|---|---|---|
| A001 | C001 | aaa01.jpg | xxx01.jpg |
| A002 | C033 | aaa02.jpg | xxx02.jpg |
| A003 | C037 | aaa02.jpg | xxx03.jpg |
| A004 | C003 | aaa03.jpg | xxx04.jpg |
| A005 | C0011 | aaa04.jpg | xxx05.jpg |
| ⋮ | ⋮ | ⋮ | ⋮ |

FIG. 15

| CONDITION ID | PURPOSE | SIZE | STYLE | FURNITURE SET |
|---|---|---|---|---|
| C001 | LIVING ROOM | L | – | DINNING TABLE, 3-PERSON SOFA, COFFEE TABLE |
| C002 | LIVING ROOM | M | – | DINNING TABLE, 2-PERSON SOFA |
| C003 | LIVING ROOM | S | – | SINGLE SOFA, TABLE |
| C004 | LIVING ROOM | L | CHIC | – |
| C005 | LIVING ROOM | S | POP | – |
| ⋮ | ⋮ | ⋮ | ⋮ | ⋮ |
| C032 | BEDROOM | L | – | LARGE BED, DESK, SIDEBOARD |
| C033 | BEDROOM | M | – | BED, DESK |
| C034 | BEDROOM | S | – | SINGLE BED |
| C035 | BEDROOM | M | MODERN | – |
| ⋮ | ⋮ | ⋮ | ⋮ | ⋮ |

RECTANGULAR–PARALLELEPIPED
(8 CORNERS)

L–SHAPED
(12 CORNERS)

FIG. 23B

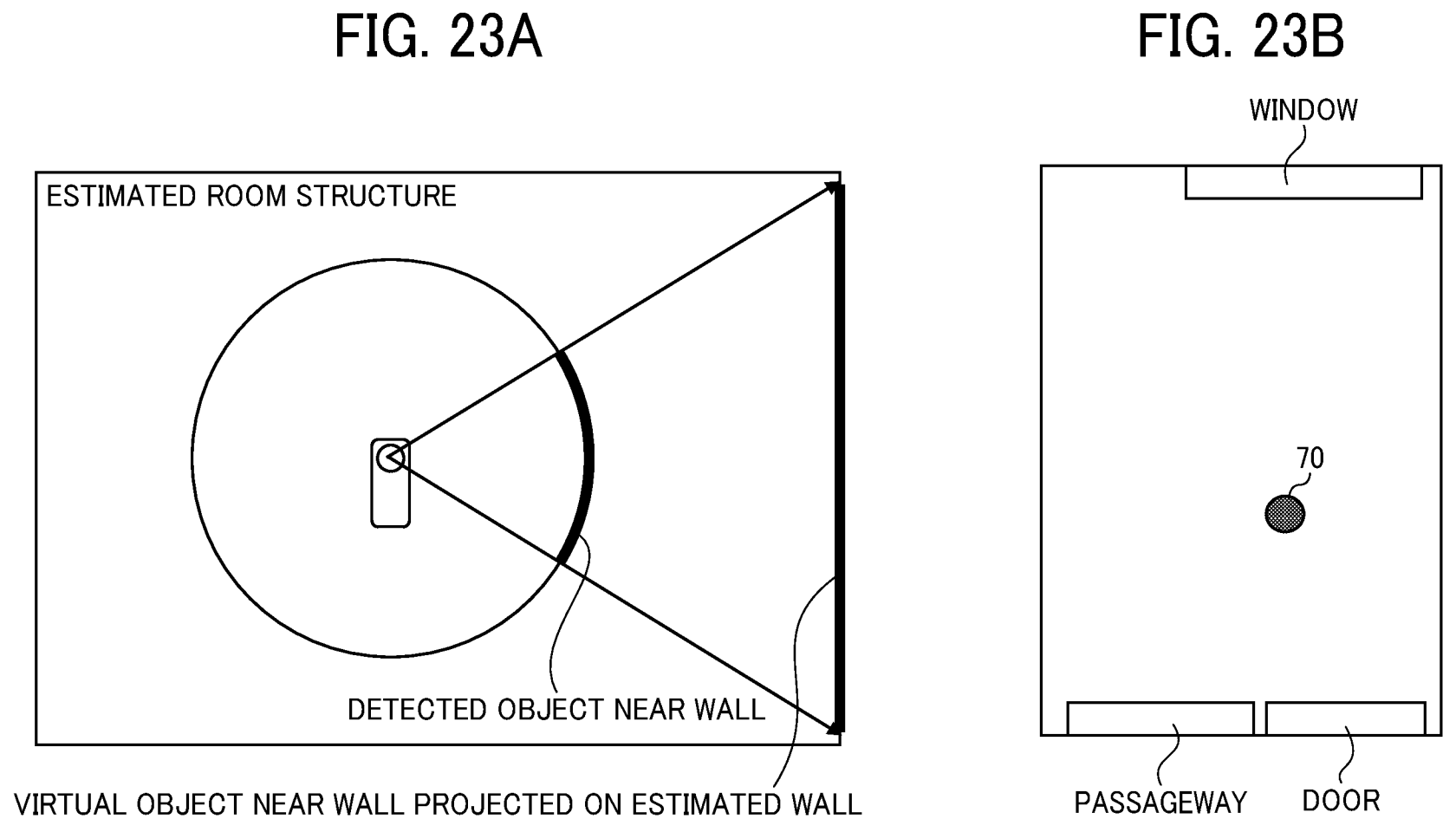

WINDOW

DOOR

PASSAGEWAY

ESTIMATED ROOM STRUCTURE

DETECTED OBJECT NEAR WALL

VIRTUAL OBJECT NEAR WALL PROJECTED ON ESTIMATED WALL

1002

CONDITION INFORMATION MANAGEMENT DB

START

DETERMINE FURNITURE TO BE ARRANGED — S61

ACQUIRE FURNITURE INFORMATION — S62

ESTIMATE ARRANGEMENT ALLOWABLE REGION — S63

ARRANGE 3D MODEL OF FURNITURE — S64

ALL FURNITURE ARRANGED? — S65          NO

YES

END

70

VIRTUAL OBJECT

RUG

FRONT

SHADOW IS CAST ON OBJECT.

SHADOW IS CAST WHERE THERE IS NOTHING BY SHADOW CATCHER.

IMAGE BASED LIGHTING

NORMAL LIGHTING

IMAGE ID: A002

IMAGE ID: A001

| ID | TYPE | POSITION INFORMATION (x, y, z) | LINK |
|---|---|---|---|
| R001 | Rug | (0, 0, −1.5) | http://***** |
| R002 | Bed | (1, 0.5, −1.5) | http://***** |
| R003 | Plant | (3, 2, −1.5) | http://***** |
| ... | ... | ... | ... |

600c

600d

1

IMAGE PROCESSING METHOD, RECORDING MEDIUM, AND IMAGE PROCESSING SYSTEM

CROSS-REFERENCE TO RELATED APPLICATIONS

The present application is based on PCT filing PCT/IB2021/059431, filed Oct. 14, 2021, which claims priority to Japanese Application No. 2020-187839, filed Nov. 11, 2020, the entire contents of each are incorporated herein by reference.

TECHNICAL FIELD

The disclosure content relates to an image processing method, a recording medium, and an image processing system.

BACKGROUND ART

There has been known a system that distributes image data captured by using an imaging device capable of performing imaging in all directions and that allows the situation of a remote site to be viewable in another site. A spherical image obtained by imaging a predetermined site in all directions allows a viewer to view an image in any direction. The spherical image can give the viewer realistic information. Such a system is used, for example, in the field of online previews for properties in the real estate business.

Moreover, there is a service called "home staging" that directs the space of a property through arrangement of furniture and small items in the property to give a viewer an image of a fascinating house to smoothly promote the dealing. In such a service, there is known a service that combines three-dimensional computer graphics (CG) furniture with an image in which a property is imaged instead of arranging actual furniture in the property to reduce the cost or time, or to reduce the risk of damage on the property (for example, see PTL 1 to PTL 3).

CITATION LIST

Patent Literature

[PTL 1]
JP-6570161-B
[PTL 2]
JP-6116746-B
[PTL 3]
JP-3720587-B

SUMMARY OF INVENTION

Technical Problem

With the method of related art, however, when an image of a virtual object such as furniture is combined with a captured image, the virtual object may be arranged at an unnatural position for a viewer who views the image. There is a room for improvement in view of accuracy of automatic arrangement of a virtual object.

Solution to Problem

An image processing method according to an embodiment of the present disclosure is an image processing method to be executed by an image processing system. The image processing method includes estimating a structure of a space inside a construction from a background image in which the space is imaged in all directions; estimating a region in which a virtual object is allowed to be arranged in the space based on the estimated structure; and combining the virtual object with the background image in the estimated region.

Advantageous Effects of Invention

According to the disclosure, an advantageous effect is attained such that a virtual object can be automatically arranged at an appropriate position in a space inside a construction.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 4A illustrates a hemispherical image (front) captured by an imaging device.

FIG. 4B illustrates a hemispherical image (back) captured by the imaging device.

FIG. 4C illustrates an image expressed by equidistant cylindrical projection.

FIG. 5A conceptually illustrates a state in which a sphere is covered with an equidistant cylindrical projection image.

FIG. 5B illustrates a spherical image.

FIG. 7 illustrates a relationship between predetermined region information and an image of a predetermined region T.

FIG. 14 schematically presents an example of an image data management table.

FIG. 15 conceptually presents an example of a condition information management table.

FIG. 23A illustrates an example of a process of projecting a subject in an estimated space structure.

FIG. 23B illustrates the example of the process of projecting the subject in the estimated space structure.

FIG. 26A illustrates an example of a layout algorithm of a 3D model of furniture.

FIG. 26B illustrates the example of the layout algorithm of the 3D model of the furniture.

FIG. 26C illustrates the example of the layout algorithm of the 3D model of the furniture.

FIG. 39 conceptually presents an example of an additional information management table.

DESCRIPTION OF EMBODIMENTS

Figure 1:
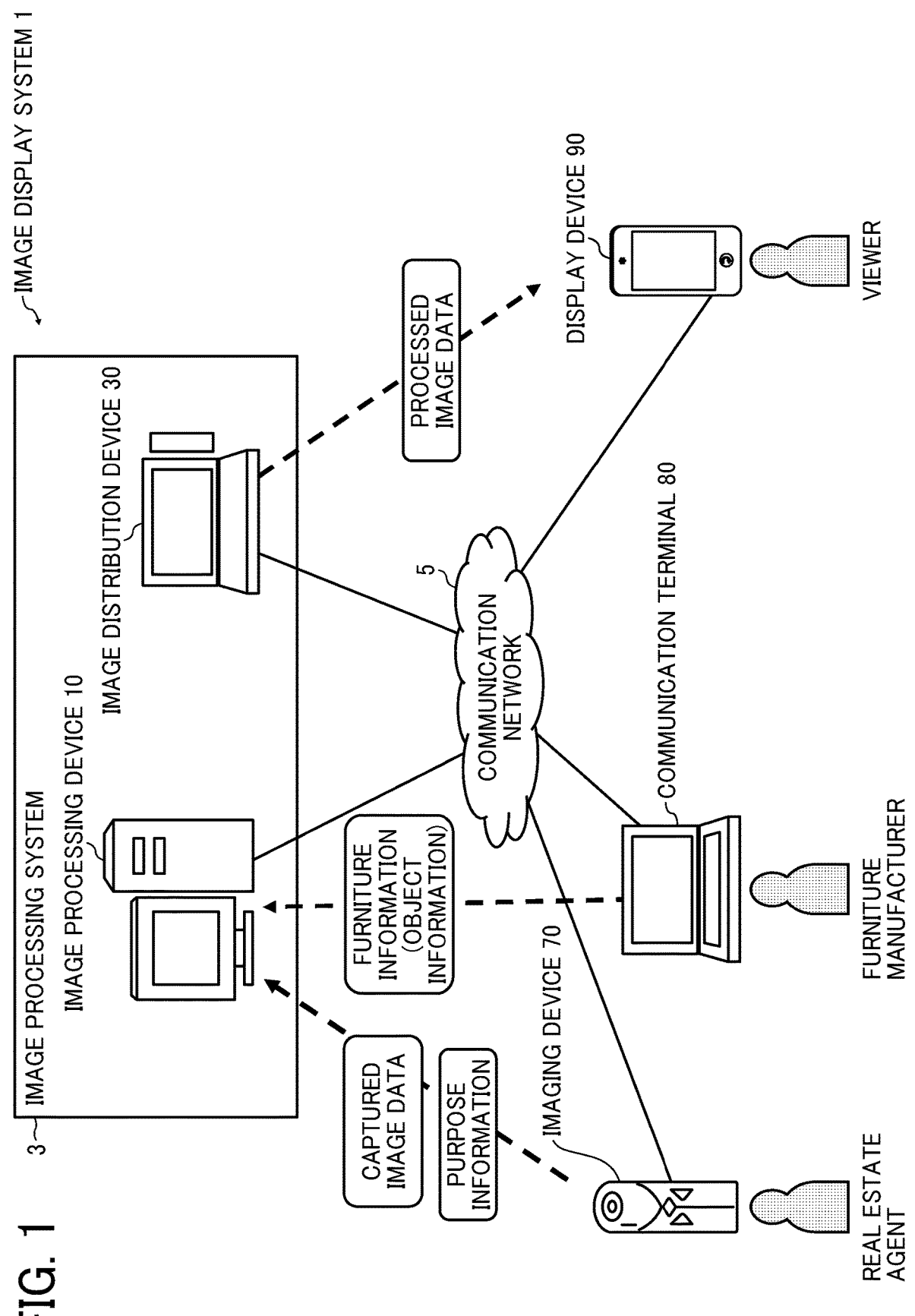
FIG. 1 illustrates an example of a general arrangement of an image display system.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereafter, embodiments for implementing the disclosure are described with reference to the drawings. Like reference signs are applied to identical or corresponding components throughout the description of the drawings and redundant description thereof is omitted.

An overview of configurations of an image display system 1 according to an embodiment is described with reference to FIG. 1. FIG. 1 illustrates an example of a general arrangement of the image display system 1. The image display system 1 illustrated in FIG. 1 causes a display device 90 to display an image of a space inside a construction such as a real estate property and hence allows a viewer to view a real estate property online.

As illustrated in FIG. 1, the image display system 1 includes an image processing device 10, an image distribution device 30, an imaging device 70, a communication terminal 80, and the display device 90. The image processing device 10, the image distribution device 30, the imaging device 70, the communication terminal 80, and the display device 90 constituting the image display system 1 can communicate with one another via a communication network 5. The communication network 5 is implemented by, for example, the Internet, a mobile communication network, or a local area network (LAN).

The communication network 5 is not limited to wired communication and may include a network using wireless communication, such as third generation (3G), fourth generation (4G), fifth generation (5G), Wireless Fidelity (Wi-Fi, registered trademark), Worldwide Interoperability for Microwave Access (WiMAX), or Long Term Evolution (LTE).

The image processing device 10 is a server computer that executes image processing on a captured image obtained by imaging a space inside a construction such as a real estate property. The image processing device 10 combines a virtual object with the captured image, for example, based on captured image data transmitted from the imaging device 70, purpose information indicative of a purpose of the space imaged by the imaging device 70, and furniture information transmitted from the communication terminal 80.

The furniture information includes, for example, data indicative of a 3D model of furniture, and furniture setting data indicative of a rule related to arrangement of furniture. The 3D model of furniture is an example of a virtual object.

The furniture information is an example of object information. Examples of the virtual object include 3D models of a home electrical appliance, an electrical product, a decoration, a picture, an illumination, a fitting, and a fixture.

The image distribution device 30 is a server computer that distributes processed image data processed by the image processing device 10.

The image processing device 10 and the image distribution device 30 are referred to as an image processing system 3. The image processing system 3 may be, for example, a computer with all or part of respective functions of the image processing device 10 and the image distribution device 30 collected therein.

Alternatively, each of the image processing device 10 and the image distribution device 30 may be implemented such that the respective functions are distributed in a plurality of computers. The image processing device 10 and the image distribution device 30 are described as server computers that exist in a cloud environment. However, the image processing device 10 and the image distribution device 30 may be servers that exist in an on-premise environment.

The imaging device 70 is a special digital camera (spherical imaging device) capable of imaging a space inside a construction such as a real estate property and hence acquiring a spherical (360°) image. For example, a real estate agent who manages or sells a real estate property uses the imaging device 70.

The imaging device 70 may be a wide-angle camera or a stereo camera capable of acquiring a wide-angle image having an angle of view of a predetermined value or more. The wide-angle image is typically an image captured using a wide-angle lens, and is an image captured using a lens capable of performing imaging in a wider range than the range that human eyes sense. That is, the imaging device 70 is an imager capable of acquiring an image (spherical image, wide-angle image) captured using a lens having a focal length smaller than a predetermined value. The wide-angle image typically represents an image captured using a lens having a focal length of 35 mm or less as converted into a 35-mm film.

The captured image obtained by the imaging device 70 may be a moving image or a still image, or both a moving image and a still image. The captured image may include sound together with an image.

The communication terminal 80 is a computer such as a notebook personal computer (PC) that provides information on a virtual object to be arranged in a space appearing in a captured image to the image processing device 10. For example, a furniture manufacturer that manufactures or sells furniture to be arranged uses the communication terminal 80.

The display device 90 is a computer such as a smartphone to be used by a viewer of an image. The display device 90 displays an image distributed from the image distribution device 30. The display device 90 is not limited to a smartphone. The display device 90 may be, for example, a PC, a tablet terminal, a wearable terminal, a head mount display (HMD), a projector (PJ), or an interactive white board (IWB) that is a white board having an electronic white board function capable of intercommunication.

Figure 2:
FIG. 2 illustrates an example of a spherical image before a virtual object is arranged.

An image that is displayed on the display device 90 in the image display system 1 is described with reference to FIGS. 2 and 3. FIG. 2 illustrates an example of a spherical image before a virtual object is arranged. An image illustrated in FIG. 2 is a spherical image in which a room of a real estate property that is an example of a space inside a construction is imaged by the imaging device 70.

A spherical image can be captured by imaging the inside of a room in all directions, and hence is suitable for viewing a real estate property. While various forms of spherical images are present, in many cases, spherical images are generated by an equirectangular projection method (equidistant cylindrical projection). An image generated by equidistant cylindrical projection is advantageous in that such an image has a rectangular outer shape and hence image data is efficiently and easily stored, and that such an image has less distortion near the equator and hence has a straight line without distortion in the vertical direction, thereby providing a relatively natural view.

Figure 3:
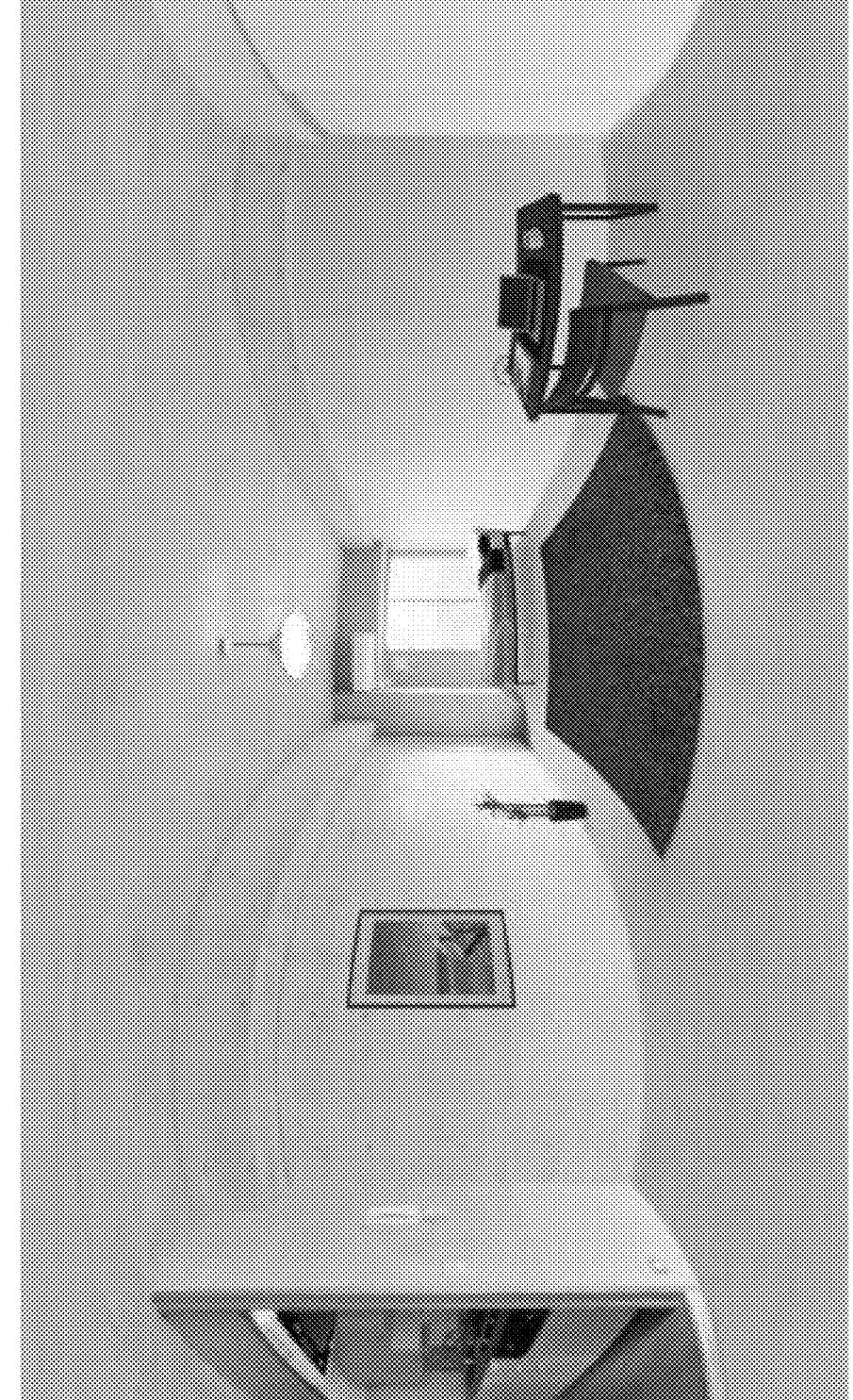
FIG. 3 illustrates an example of a processed image in which a virtual object is arranged.

FIG. 3 illustrates an example of a processed image in which a virtual object is arranged. The image illustrated in FIG. 3 presents a state in which furniture is arranged in the room appearing in the image in FIG. 2.

The image in FIG. 3 includes the spherical image illustrated in FIG. 2 as a background image and a 3D model of furniture that is an example of a virtual object and that is combined with the background image. The image processing device 10 arranges a 3D model of furniture in a natural state based on a structure, such as the floor, wall, or ceiling of the room imaged by the imaging device 70. As illustrated in FIG. 3, a desk, a bed, and so forth are arranged along the wall of the room, and a passageway that is usually used is not obstructed by furniture.

In related art, to arrange a 3D model of furniture in a spherical image obtained by imaging a room that is a real estate property, it is required to arrange furniture at a natural position when seen from an imaging position of an imaging device. Hence, a manual operation by a user is required to align the arrangement position and orientation. There is a method of automatically arranging a furniture model. However, to recognize the structure of a room where furniture is arranged, an input of a floor plan for the room and an input operation by a user are required. There is still a room for improvement in view of increasing the accuracy of automatic arrangement of a virtual object without a troublesome work.

The image processing system 3 detects the structure of a room or a subject fitted in the room by using a spherical image obtained by imaging the inside of the room to estimate an arrangement allowable region of a virtual object. The image processing system 3 arranges the virtual object in the estimated arrangement allowable region, and generates a processed image illustrated in FIG. 3 in which the arranged virtual object is combined with the spherical image. Thus, the image processing system 3 can naturally arrange furniture based on the state of the room roughly estimated based on the spherical image.

The room that is the real estate property is an example of a space inside a construction. The construction is, for example, an architecture such as a house, an office, or a shop. The spherical image is a captured image captured by the imaging device 70, and is an example of a background image in which the space inside a construction is imaged in all directions.

A method of generating a spherical image is described with reference to FIGS. 4A to 10B. An overview of processing until generation of a spherical image from an image captured by the imaging device 70 is described with reference to FIGS. 4A to 5B.

FIG. 4A illustrates a hemispherical image (front) captured by the imaging device 70. FIG. 4B illustrates a hemispherical image (back) captured by the imaging device 70. FIG. 4C illustrates an image expressed by equidistant cylindrical projection (hereinafter, referred to as "equidistant cylindrical projection image"). FIG. 5A conceptually illustrates a state in which a sphere is covered with an equidistant cylindrical projection image. FIG. 5B illustrates a spherical image.

The imaging device 70 includes an imaging element on either of the front surface side (front) and the rear surface side (back). The imaging elements (image sensors) are used together with optical members such as a lens capable of capturing a hemispherical image (having an angle of view of 180° or more). The imaging device 70 uses the two imaging elements to capture images of a subject around a user, thereby obtaining two hemispherical images.

As illustrated in FIGS. 4A and 4B, the images obtained by the imaging elements of the imaging device 70 are curved hemispherical images (front and back). The imaging device 70 combines the hemispherical image (front) and the hemispherical image (back) inverted 180 degrees from the hemispherical image (front) to create an equidistant cylindrical projection image EC illustrated in FIG. 4C.

The imaging device 70, by using Open Graphics Library for Embedded Systems (OpenGL ES), attaches the equidistant cylindrical projection image EC to cover a spherical surface as illustrated in FIG. 5A and creates a spherical image (spherical panoramic image) CE as illustrated in FIG. 5B. In this way, the spherical image CE is expressed as an image that the equidistant cylindrical projection image EC faces the center of the sphere.

The OpenGL ES is a graphics library that is used for visualizing data of two-dimensions (2D) and three-dimensions (3D). The spherical image CE may be a still image or a moving image. A conversion method is not limited to the OpenGL ES, and can be any method as far as being capable of converting hemispherical images into an equidistant cylindrical projection image. For example, the conversion method may be an arithmetic operation using a central processing unit (CPU) or an arithmetic operation using OpenCL.

As described above, since the spherical image CE is an image attached to cover a spherical surface, when a person sees the spherical image CE, the person feels uncomfortable. The imaging device 70 expresses a predetermined region T that is a portion of the spherical image CE (hereinafter, referred to as "predetermined region image") as a planar image with less curve to provide expression that does not give the person uncomfortable feeling. The predetermined region image is described with reference to FIGS. 6 and 7.

Figure 6:
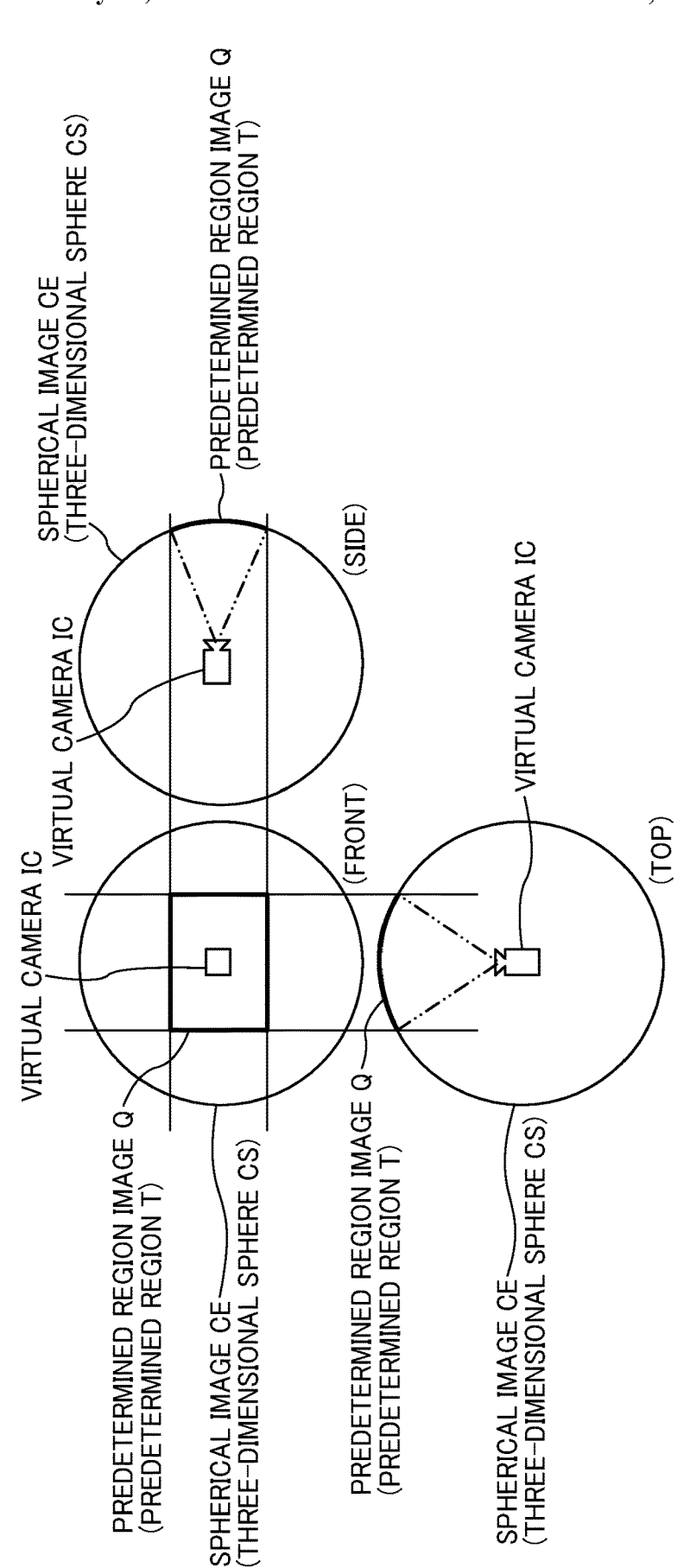
FIG. 6 illustrates a position of a virtual camera and a position of a predetermined region when a spherical image is a three-dimensional sphere.

FIG. 6 illustrates a position of a virtual camera and a position of a predetermined region when a spherical image is assumed as a three-dimensional sphere. A virtual camera IC corresponds to a position of a viewpoint of a user who sees a spherical image CE expressed as a three-dimensional sphere.

FIG. 6 illustrates a spherical image CE in the form of a three-dimensional sphere CS. When the spherical image CE generated as described above is assumed as the three-dimensional sphere CS, the virtual camera IC is located inside the spherical image CE as illustrated in FIG. 6. A predetermined region T in the spherical image CE is an imaging region of the virtual camera IC. The predetermined region T is determined based on predetermined region information indicating an imaging direction and an angle of view of the virtual camera IC in a three-dimensional virtual space including the spherical image CE. Zooming of the predetermined region T can be expressed also as by bringing the virtual camera IC toward or away from the spherical image CE. A predetermined region image Q is an image of the predetermined region T in the spherical image CE. The predetermined region T can be determined based on an angle of view α, and a distance f from the virtual camera IC to the spherical image CE.

The predetermined region image Q is displayed as an image of an imaging region of the virtual camera IC on a predetermined display. Description is given below using imaging directions (ea, aa) and an angle of view (α) of the virtual camera IC. Alternatively, the predetermined region T may be determined based on an imaging region (X, Y, Z) of the virtual camera IC that is the predetermined region T instead of the angle of view α and the distance f.

Figure 7:
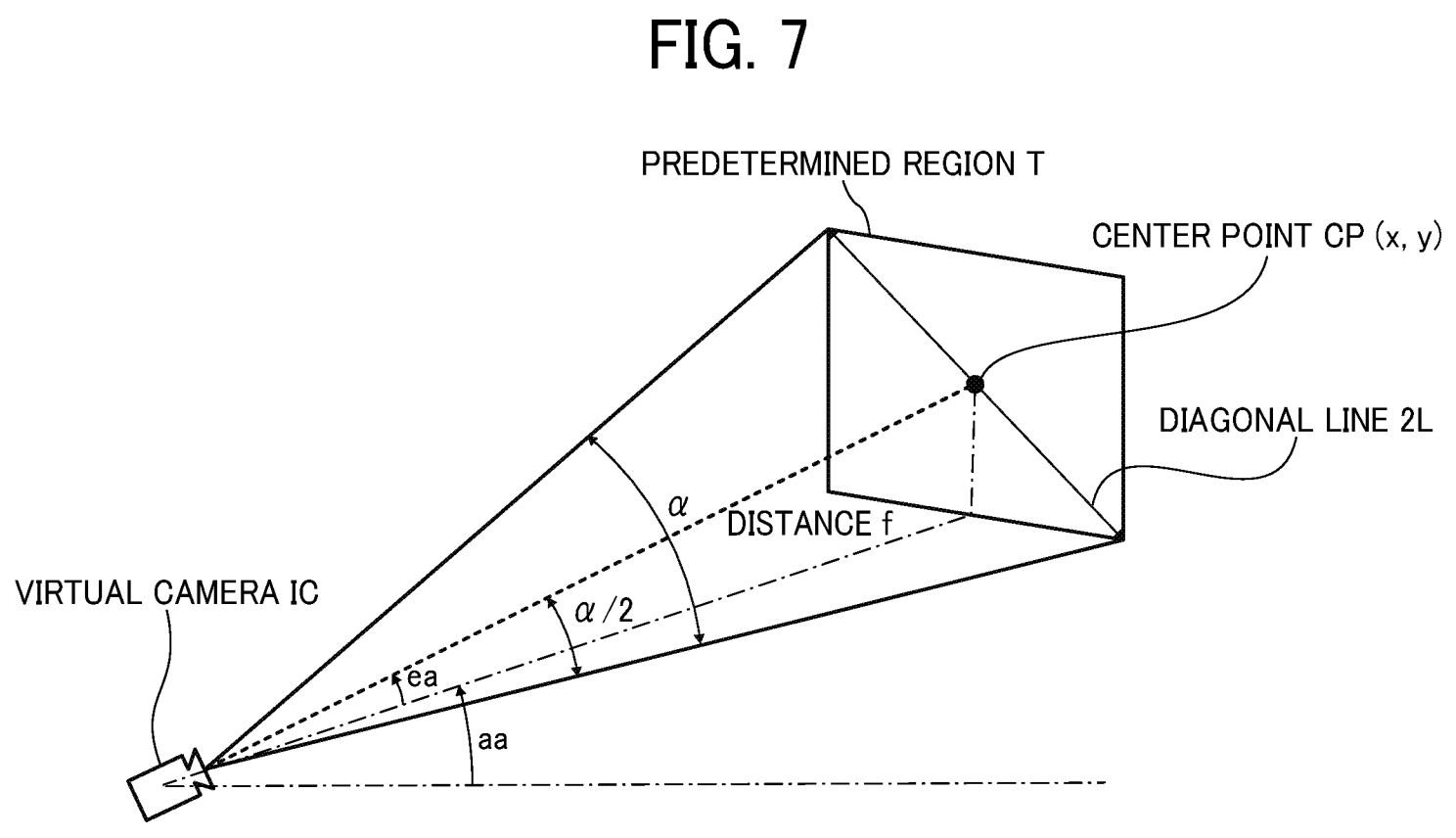

A relationship between predetermined region information and an image of a predetermined region T is described next with reference to FIG. 7. FIG. 7 illustrates a relationship between predetermined region information and an image of a predetermined region T.

As illustrated in FIG. 7, "ea" denotes an elevation angle, "aa" denotes an azimuth angle, and "α" denotes an angle of view (angle). That is, the posture of the virtual camera IC is changed such that the watching point of the virtual camera IC indicated by the imaging directions (ea, aa) coincides with the center point CP (x, y) of the predetermined region T that is the imaging region of the virtual camera IC.

As illustrated in FIG. 7, the center point CP (x, y) when α denotes the angle of view along the diagonal line of the predetermined region T expressed by the angle of view α of the virtual camera IC serves as a parameter ((x, y)) of the predetermined region information. A predetermined region image Q is an image of the predetermined region T in the spherical image CE. Reference sign "f" denotes a distance from the virtual camera IC to the center point CP (x, y). Reference sign "L" denotes a distance between any vertex of the predetermined region T and the center point CP (x, y). Reference sign "2L" denotes a diagonal line. Referring to FIG. 7, a trigonometric function expressed in Expression (1) below is typically established.

$$L/f = \tan(\alpha/2) \tag{1}$$

Figure 8:
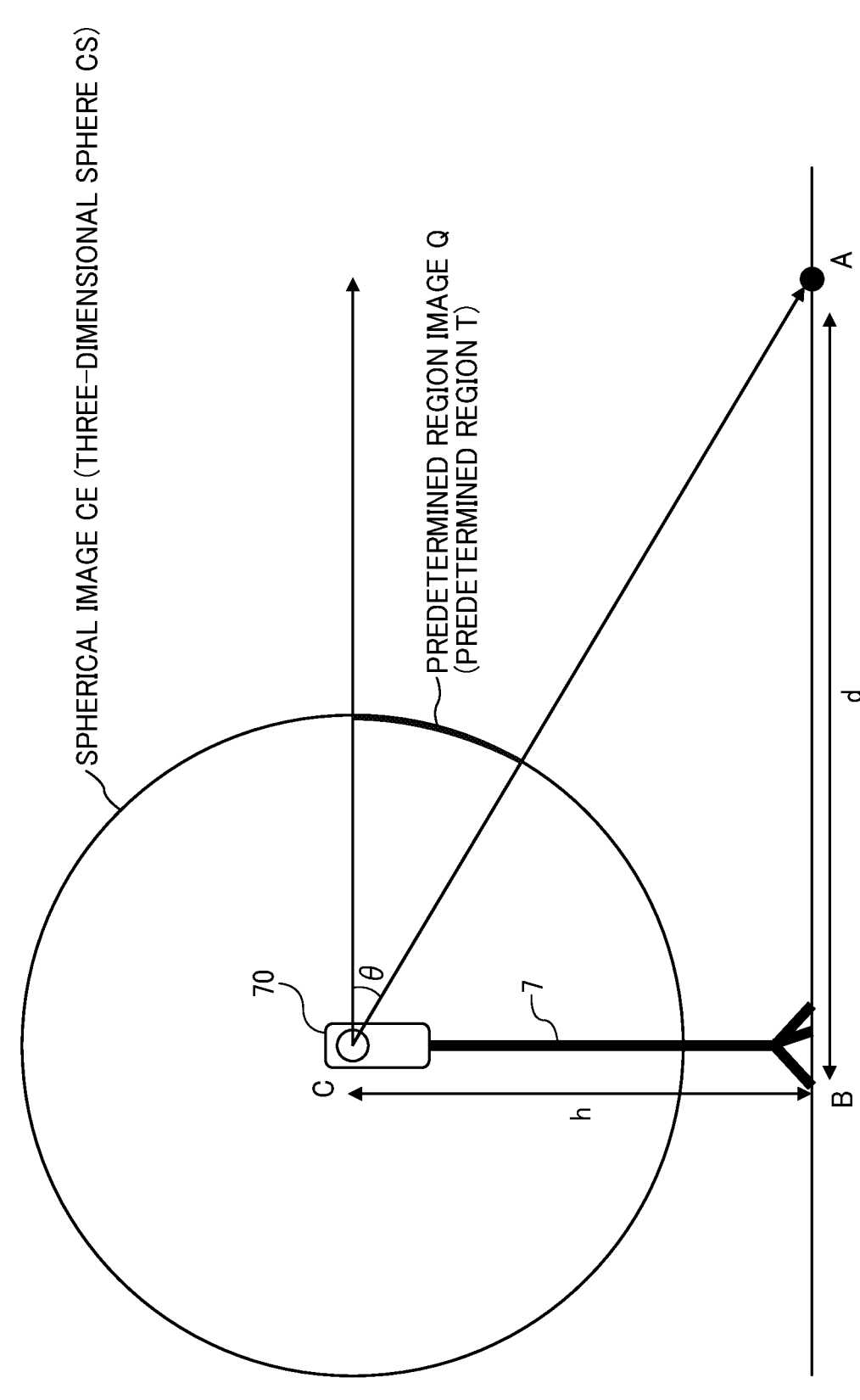
FIG. 8 illustrates an example of a state during imaging by the imaging device.

A state during imaging by the imaging device 70 is described next with reference to FIG. 8. FIG. 8 illustrates an example of the state during imaging by the imaging device 70. To entirely image a room of a real estate property or the like, it is desirable to install the imaging device 70 at a position with a height close to the height of human eyes.

Hence, as illustrated in FIG. 8, the imaging device 70 typically performs imaging while the imaging device 70 is secured using a support 7 such as a monopod or a tripod. The imaging device 70 is a 360-degree imaging device capable of acquiring all-around rays in all directions. In other words, the imaging device 70 acquires an image (spherical image CE) on a unit sphere around the imaging device 70.

The imaging device 70 determines the coordinates of a spherical image when the imaging direction is determined. For example, as illustrated in FIG. 8, a point A is located at a distance separated from the center point C of the imaging device 70 by (d, −h). When θ denotes an angle defined by a segment AC and the horizontal direction, the angle θ can be expressed by Expression (2) below.

$$\theta = \arctan(h/d) \tag{2}$$

When it is assumed that the point A is located at the depression angle θ, a distance d between the point A and a point B can be expressed by Expression (3) below using the installation height h of the imaging device 70.

$$d = h/\tan\theta \tag{3}$$

Figure 9A:
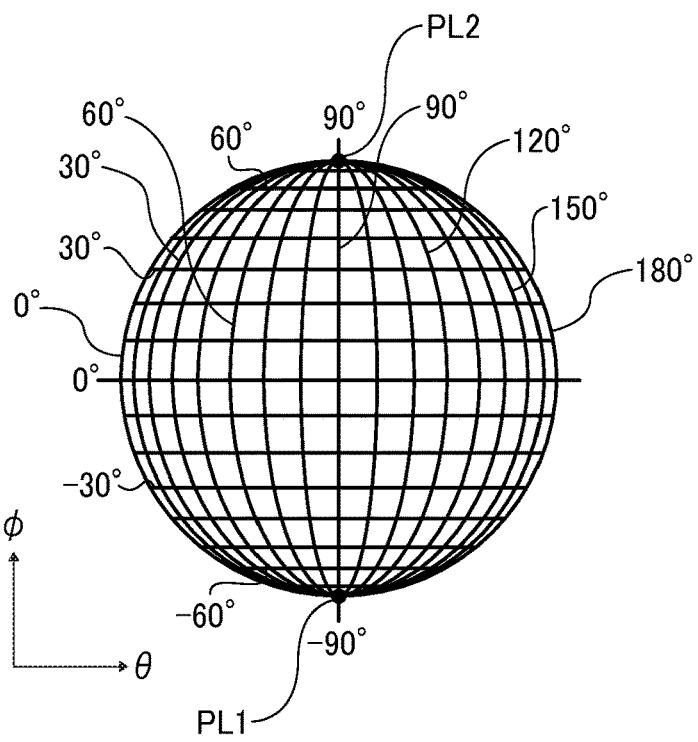
FIG. 9A illustrates an example of a spherical image.
Figure 9B:
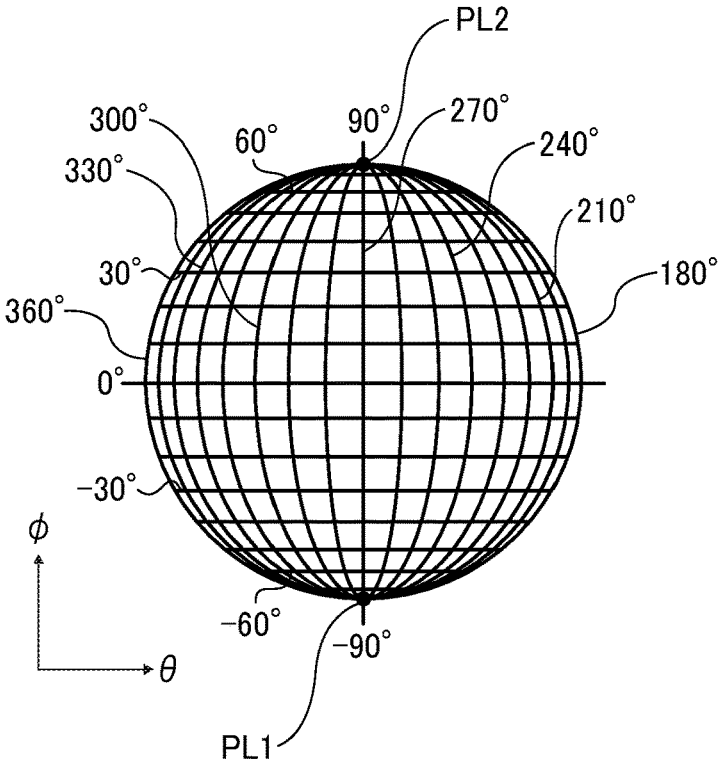
FIG. 9B illustrates the example of the spherical image.

An overview of a process of converting position information on a spherical image into the coordinates on a planar image converted from the spherical image is described below. FIGS. 9A and 9B illustrate an example of a spherical image. FIG. 9A illustrates a hemispherical image illustrated in FIG. 4A in which positions at equal incident angles in the horizontal direction and the vertical direction with respect to the optical axis are connected. Hereinafter, the incident angle in the horizontal direction with respect to the optical axis is referred to as "θ", and the incident angle in the vertical direction with respect to the optical axis is referred to as "φ".

Figure 10A:
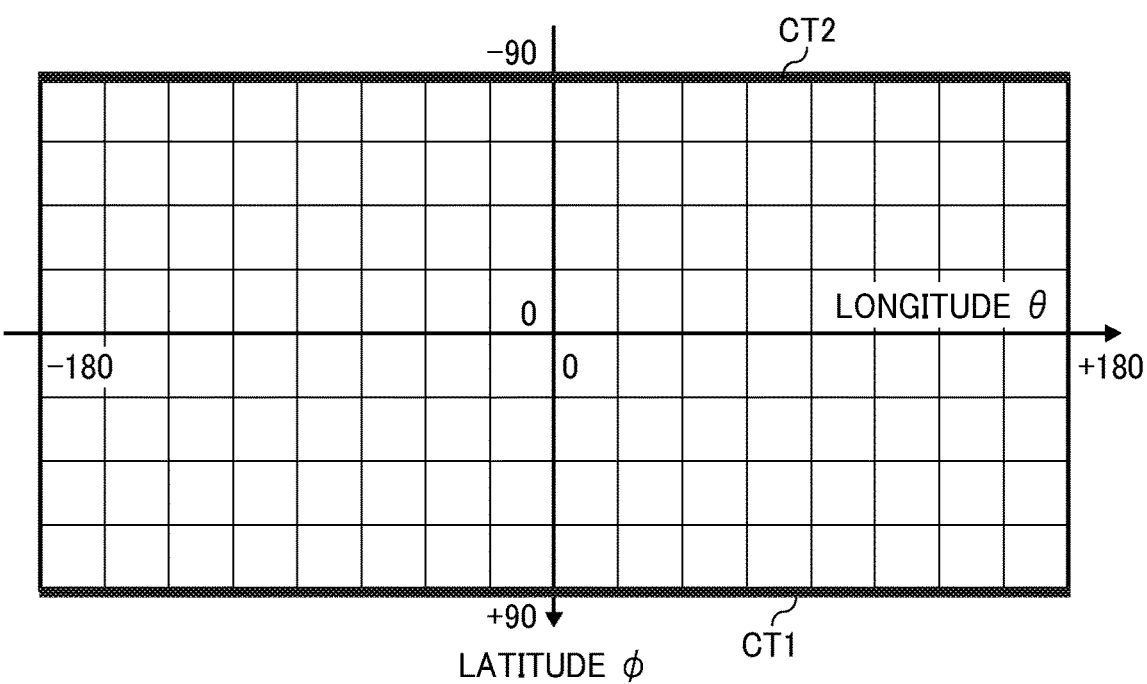
FIG. 10A illustrates an example of a planar image converted from a spherical image.

FIG. 10A illustrates an example of an image processed by equidistant cylindrical projection. More particularly, the images illustrated in FIGS. 9A and 9B are associated with each other using a look up table (LUT) generated in advance, the result image is processed by equidistant cylindrical projection, and the images illustrated in FIGS. 9A and 9B processed in this manner are combined. Thus, the imaging device 70 generates a planar image illustrated in FIG. 10A corresponding to the spherical image. The equidistant cylindrical projection image EC illustrated in FIG. 4C is an example of the planar image illustrated in FIG. 10A.

As illustrated in FIG. 10A, in the image processed by equidistant cylindrical projection, the latitude (θ) and the longitude (φ) are orthogonal to each other. In the example illustrated in FIG. 10A, the center of the image is set as (0, 0), the latitude direction is expressed in a range from −90 to +90, and the longitude direction is expressed in a range from −180 to +180. Accordingly, any position in the spherical image can be indicated. For example, the coordinates at the upper left corner of the image is (−180, −90). The coordinates of the spherical image may be indicated in the form using numbers of 360 degrees as illustrated in FIG. 10A, or may be indicated by radian or in the form of numbers of pixels like a real image. Alternatively, the coordinates of the spherical image may be converted into two-dimensional coordinates (x, y) as illustrated in FIG. 10B.

Figure 10B:
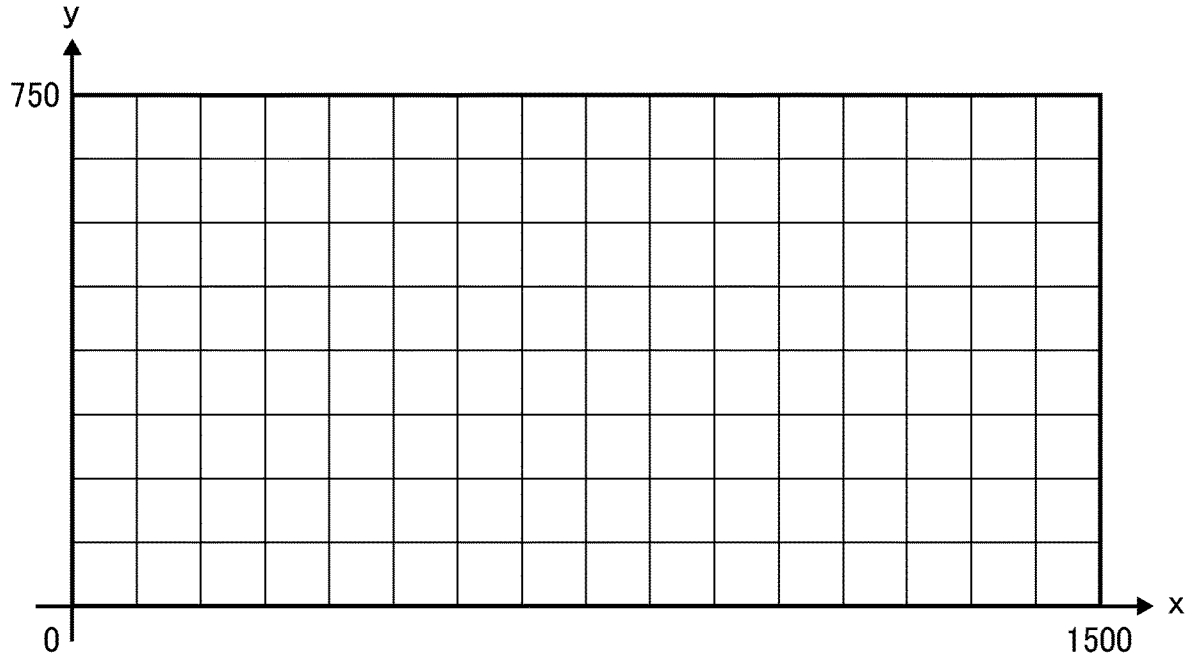
FIG. 10B illustrates another example of a planar image converted from a spherical image.

The combining process into the planar image illustrated in FIG. 10A or FIG. 10B is not limited to the process of simply continuously disposing the hemispherical images illustrated in FIGS. 9A and 9B.

For example, when the center in the horizontal direction of a spherical image is not θ=180°, the imaging device 70 pre-processes the hemispherical image illustrated in FIG. 4A and disposes the pre-processed hemispherical image at the center of the spherical image. Then, the imaging device 70 divides the image obtained by pre-processing the hemispherical image illustrated in FIG. 4B into image portions of sizes with which the image portions can be disposed in left and right portions of an image to be generated, and the hemispherical images are combined to generate the equidistant cylindrical projection image EC illustrated in FIG. 4C.

Portions in the planar image illustrated in FIG. 10A corresponding to poles (PL1 and PL2) of the hemispherical images (spherical image) illustrated in FIGS. 9A and 9B are segments CT1 and CT2. This is because, as illustrated in FIGS. 5A and 5B, the spherical image (for example, the spherical image CE) is created by attaching the planar image (equidistant cylindrical projection image EC) illustrated in FIG. 10A to the spherical surface using OpenGL ES.

Hardware configurations of respective devices constituting the image display system 1 according to the embodiment are described with reference to FIG. 11. A component may be added to or omitted from the hardware configurations illustrated in FIG. 11 if required.

Hardware configurations of the image processing device 10 are described with reference to FIG. 11. FIG. 11 illustrates an example of hardware configurations of the image processing device 10. The hardware configurations of the image processing device 10 are denoted by reference signs in a range from 100 to 199. The image processing device 10 is implemented by a computer. As illustrated in FIG. 11, the image processing device 10 includes a CPU 101, a read only memory (ROM) 102, a random access memory (RAM) 103, a hard disk (HD) 104, a hard disk drive (HDD) controller 105, a display 106, an external device connection interface (I/F) 108, a network I/F 109, a bus line 110, a keyboard 111, a pointing device 112, a digital versatile disk rewritable (DVD-RW) drive 114, and a medium I/F 116.

Among these components, the CPU 101 controls the entire operation of the image processing device 10. The ROM 102 stores a control program such as an initial program loader (IPL) to boot the CPU 101. The RAM 103 is used as a work area for the CPU 101. The HD 104 stores various pieces of data such as a program. The HDD controller 105 controls reading or writing of various pieces of data from or to the HD 104 under control of the CPU 101. The display 106 displays various information such as a cursor, a menu, a window, characters, or an image. The display 106 may be a touch panel display including an input device. The external device connection I/F 108 is an interface that couples the image processing device 10 to various external devices. Examples of the external devices include, but not limited to, a Universal Serial Bus (USB) memory and a printer. The network I/F 109 is an interface that controls communication of data through the communication network 5. The bus line 110 is, for example, an address bus or a data bus that electrically couples the components such as the CPU 101 illustrated in FIG. 11.

The keyboard 111 is an example of an input device provided with a plurality of keys for allowing a user to input characters, numerals, or various instructions. The pointing device 112 is an example of an input device that allows a user to select or execute various instructions, select a target for processing, or move a cursor being displayed.

The input device is not limited to the keyboard 111 and the pointing device 112, and may be a touch panel or a voice input device. The DVD-RW drive 114 controls reading or writing of various pieces of data from or to a DVD-RW 113 as an example of a removable recording medium.

The removable recording medium is not limited to the DVD-RW and may be a DVD recordable (DVD-R), Blu-ray (registered trademark) disc, or the like. The medium I/F 116 controls reading or writing (storing) of data from or to a recording medium 115 such as a flash memory.

Figure 11:
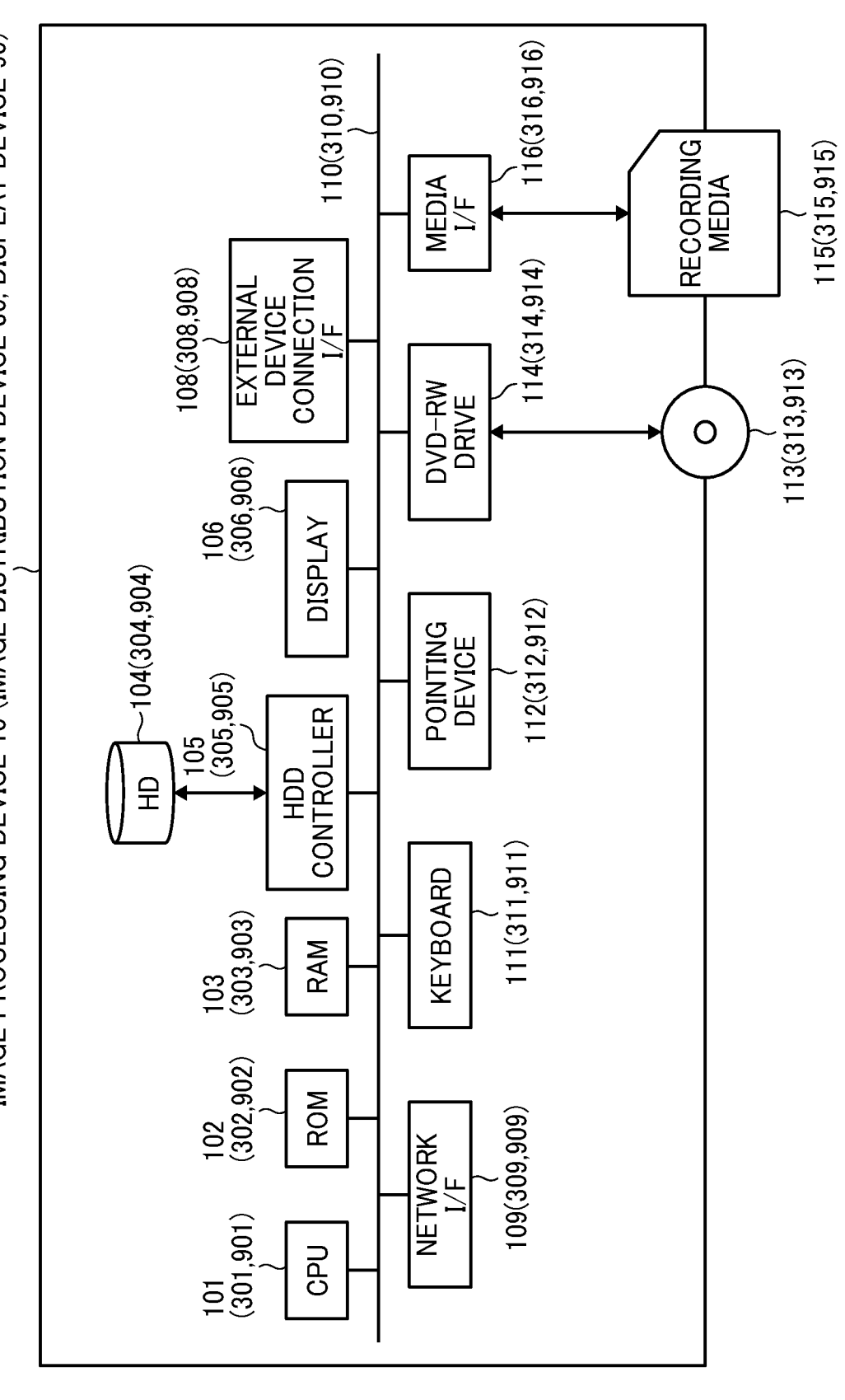
FIG. 11 illustrates an example of hardware configurations of an image processing device, an image distribution device, and a display device.

FIG. 11 illustrates an example of hardware configurations of the image distribution device 30. The hardware configurations of the image distribution device 30 are denoted by reference signs in a range from 300 to 399. The image distribution device 30 is implemented by a computer. As illustrated in FIG. 11, the image distribution device 30 has configurations similar to those of the image processing device 10. Hence, the description of the hardware configurations is omitted.

FIG. 11 illustrates an example of hardware configurations of the display device 90. The hardware configurations of the display device 90 are denoted by reference signs in a range from 900 to 999. The display device 90 is implemented by a computer. As illustrated in FIG. 11, the display device 90 has configurations similar to those of the image processing device 10. Hence, the description of the hardware configurations is omitted.

The above-described programs can be stored in any computer-readable recording medium in a file format installable or executable by the computer, for distribution.

Examples of the recording medium include a compact disc recordable (CD-R), a digital versatile disk (DVD), a Blu-ray disc, a secure digital (SD) card, and a USB memory. The recording medium can be provided as a program product to the inside or outside of the country. For example, the image processing system 3 executes a program to implement an image processing method according to an embodiment of the disclosure.

Figure 12:
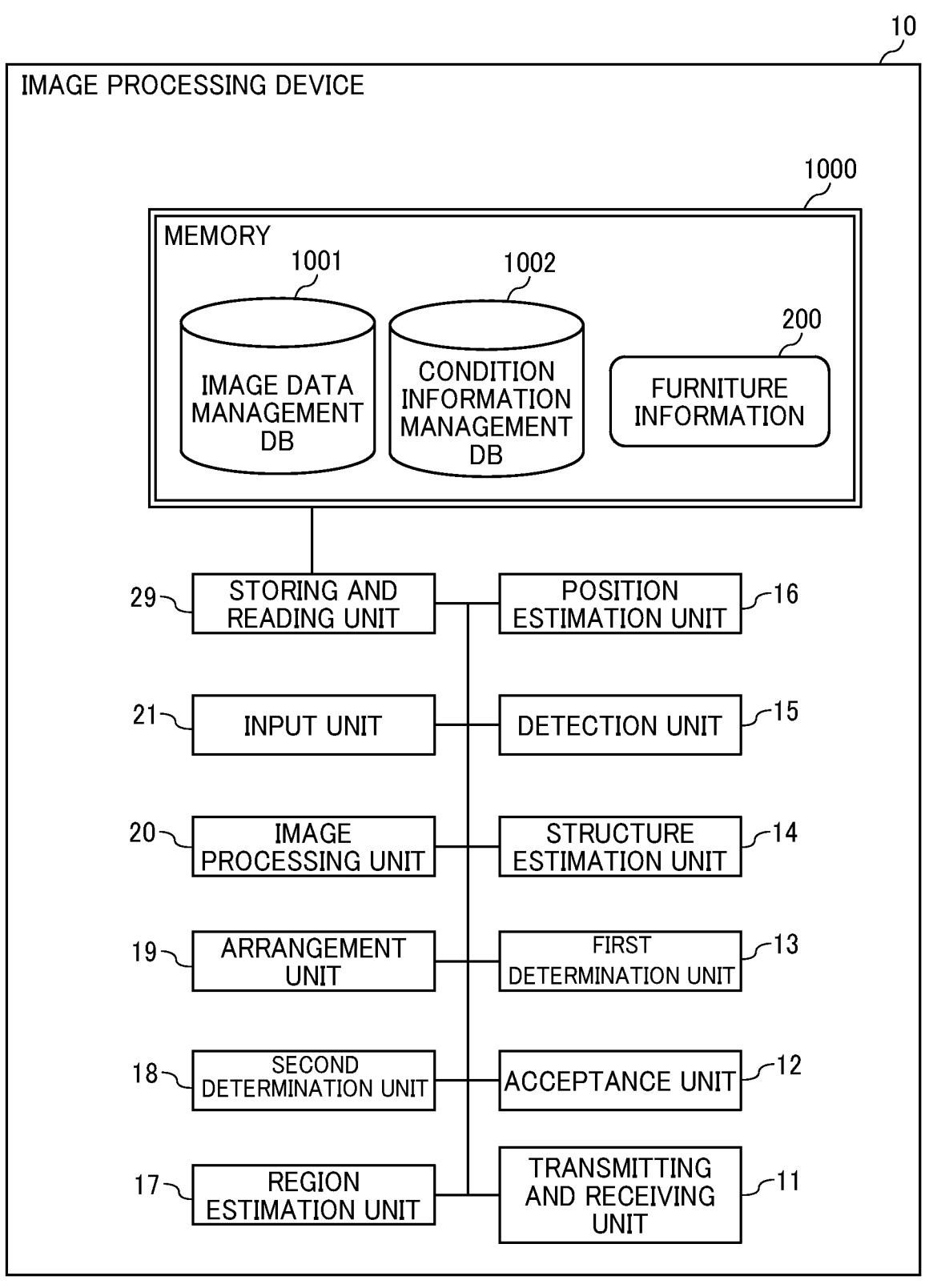
FIG. 12 illustrates an example of functional configurations of the image processing device.
Figure 13:
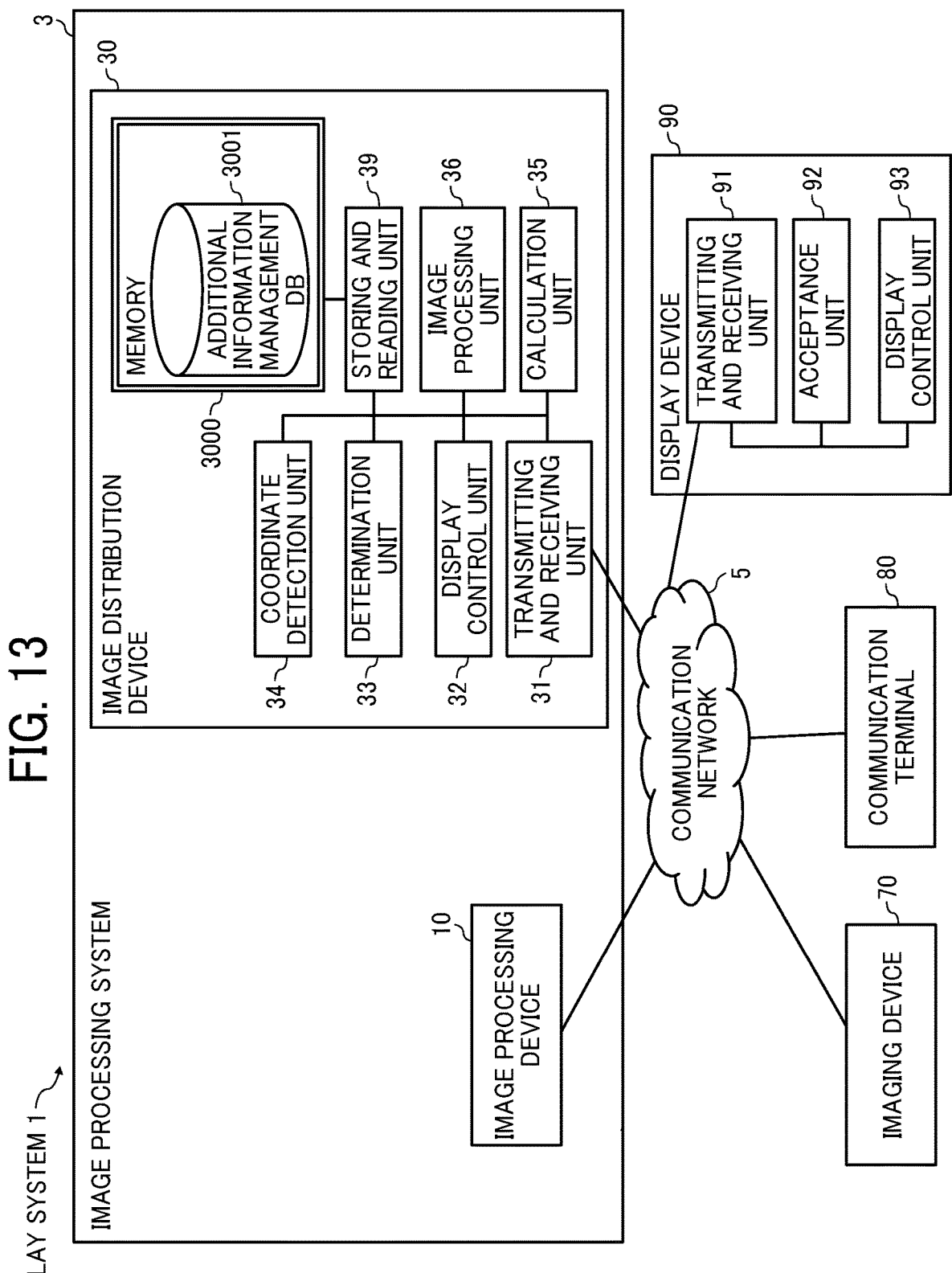
FIG. 13 illustrates an example of functional configurations of the image display system.

Functional configurations of the image display system 1 according to the embodiment are described with reference to FIGS. 12 to 15. FIGS. 12 and 13 illustrate an example of functional configurations of the image display system 1. FIGS. 12 and 13 illustrate a device or a terminal related to a process or an operation described later among the devices and terminals illustrated in FIG. 1.

Functional configurations of the image processing device 10 are described with reference to FIG. 12. The image processing device 10 includes a transmitting and receiving unit 11, an acceptance unit 12, a first determination unit 13, a structure estimation unit 14, a detection unit 15, a position estimation unit 16, a region estimation unit 17, a second determination unit 18, an arrangement unit 19, an image processing unit 20, an input unit 21, and a storing and reading unit 29. These units are functions that are implemented by or means that are caused to function by operating any of the components illustrated in FIG. 11 in response to the instructions of the CPU 101 according to a program for an image processing device expanded from the HD 104 to the RAM 103. The image processing device 10 also includes a memory 1000 implemented by the ROM 102, the RAM 103, and the HD 104 illustrated in FIG. 11.

The transmitting and receiving unit 11 is mainly implemented by the processing of the CPU 101 with respect to the network I/F 109. The transmitting and receiving unit 11 transmits and receives various pieces of data or information to and from other devices or terminals via the communication network 5.

The acceptance unit 12 is mainly implemented by processing of the CPU 101 with respect to the keyboard 111 or the pointing device 112. The acceptance unit 12 accepts various selections or inputs from a user. The first determination unit 13 is implemented by the processing of the CPU 101. The first determination unit 13 makes various determinations.

The structure estimation unit 14 is implemented by the processing of the CPU 101. The structure estimation unit 14 estimates a structure of a space based on a background image in which a space inside a construction is imaged in all directions.

The detection unit 15 is implemented by the processing of the CPU 101. The detection unit 15 detects a subject appearing in the background image.

The position estimation unit 16 is implemented by the processing of the CPU 101. The position estimation unit 16 estimates the position of the subject in the space detected by the detection unit 15.

The region estimation unit 17 is implemented by the processing of the CPU 101. The region estimation unit 17 estimates a region where the virtual object is allowed to be arranged in the space based on the structure of the space estimated by the structure estimation unit 14.

The second determination unit 18 is implemented by the processing of the CPU 101. The second determination unit 18 determines a virtual object to be arranged in the space based on the purpose of the space appearing in the background image.

The arrangement unit 19 is implemented by the processing of the CPU 101. The arrangement unit 19 arranges the virtual object in the region estimated by the region estimation unit 17. The arrangement unit 19 lays out the virtual object determined by the second determination unit 18 in the arrangement allowable region estimated by the region estimation unit 17.

The image processing unit 20 is implemented by the processing of the CPU 101. The image processing unit 20 combines the virtual object with the background image in the region estimated by the region estimation unit 17. The image processing unit 20 performs a rendering process on the arranged virtual object based on the layout result of the virtual object by the arrangement unit 19.

The input unit 21 is mainly implemented by the processing of the CPU 101 with respect to the external device connection I/F 108.

The storing and reading unit 29 is mainly implemented by the processing of the CPU 101. The storing and reading unit 29 stores various pieces of data or information in the memory 1000 or reads various pieces of data or information from the memory 1000.

FIG. 14 conceptually presents an example of an image data management table. The memory 1000 includes an image data management DB 1001 including the image data management table illustrated in FIG. 14. The image data management table manages an image ID for identifying image data, a condition ID for identifying a selection condition of a virtual object, captured image data, and processed image data in an associated manner.

FIG. 15 conceptually presents an example of a condition information management table. The condition information management table manages condition information indicative of an arrangement condition of a virtual object. The memory 1000 includes a condition information management DB 1002 including the condition information management table illustrated in FIG. 15. The condition information management table manages a condition ID for identifying a selection condition of a virtual object, the purpose and size of a room, and information on a style and a furniture set serving as an example of a virtual object to be selected in an associated manner.

Functional configurations of the image distribution device 30 are described next with reference to FIG. 13. The image distribution device 30 includes a transmitting and receiving unit 31, a display control unit 32, a determination unit 33, a coordinate detection unit 34, a calculation unit 35, an image processing unit 36, and a storing and reading unit 39. These units are functions that are implemented by or means that are caused to function by operating any of the components illustrated in FIG. 11 in response to the instructions of a CPU 301 according to a program for an image distribution device expanded from the HD 304 to the RAM 303. The image distribution device 30 also includes a memory 3000 implemented by a ROM 302, a RAM 303, and a HD 304 illustrated in FIG. 11.

The transmitting and receiving unit 31 is mainly implemented by the processing of the CPU 301 with respect to a network I/F 309. The transmitting and receiving unit 31 transmits and receives various pieces of data or information to and from other devices or terminals via the communication network 5.

The display control unit 32 is mainly implemented by the processing of the CPU 301. The display control unit 32 causes the display device 90 to display various images or characters. The display control unit 32, by using a Web browser or a dedicated application, distributes (transmits)

image data to the display device 90 to cause the display device 90 to display various screens. The various screens displayed by the display device 90 is defined by, for example, Hypertext Markup Language (HTML), Extensible Hypertext Markup Language (XHTML), Cascading Style Sheets (CSS), or JavaScript (registered trademark). The determination unit 33 is implemented by the processing of the CPU 301. The determination unit 33 makes various determinations.

The coordinate detection unit 34 is implemented by the processing of the CPU 101. The coordinate detection unit 34 detects the coordinate position of a virtual object appearing in a processed image generated by the image processing device 10. The calculation unit 35 is implemented by the processing of the CPU 301. The calculation unit 35 calculates the center position of the virtual object for superimposing additional information (described later) on the processed image based on the coordinate position detected by the coordinate detection unit 34. The image processing unit 36 is implemented by the processing of the CPU 301. The image processing unit 36 performs predetermined image processing on the processed image generated by the image processing device 10.

The storing and reading unit 39 is mainly implemented by the processing of the CPU 301. The storing and reading unit 39 stores various pieces of data or information in the memory 3000 or reads various pieces of data or information from the memory 3000.

Functional configurations of the display device 90 are described next with reference to FIG. 13. The display device 90 includes a transmitting and receiving unit 91, an acceptance unit 92, and a display control unit 93. These units are functions that are implemented by or means that are caused to function by operating any of the components illustrated in FIG. 11 in response to the instructions of a CPU 901 according to a program for a display device expanded from a HD 904 to a RAM 903.

The transmitting and receiving unit 91 is mainly implemented by the processing of the CPU 901 with respect to a network I/F 909. The transmitting and receiving unit 91 transmits and receives various pieces of data or information to and from other devices or terminals via the communication network 5.

The acceptance unit 92 is mainly implemented by the processing of the CPU 901 with respect to a keyboard 911 or a pointing device 912. The acceptance unit 92 accepts various selections or inputs from a user.

The display control unit 93 is mainly implemented by the processing of the CPU 901. The display control unit 93 causes a display 906 to display, for example, various images or characters. The display control unit 93 makes an access to the image distribution device 30 with a Web browser or a dedicated application to cause the display 906 to display an image corresponding to data distributed from the image distribution device 30. The display 906 is an example of a display device.

Figure 16:
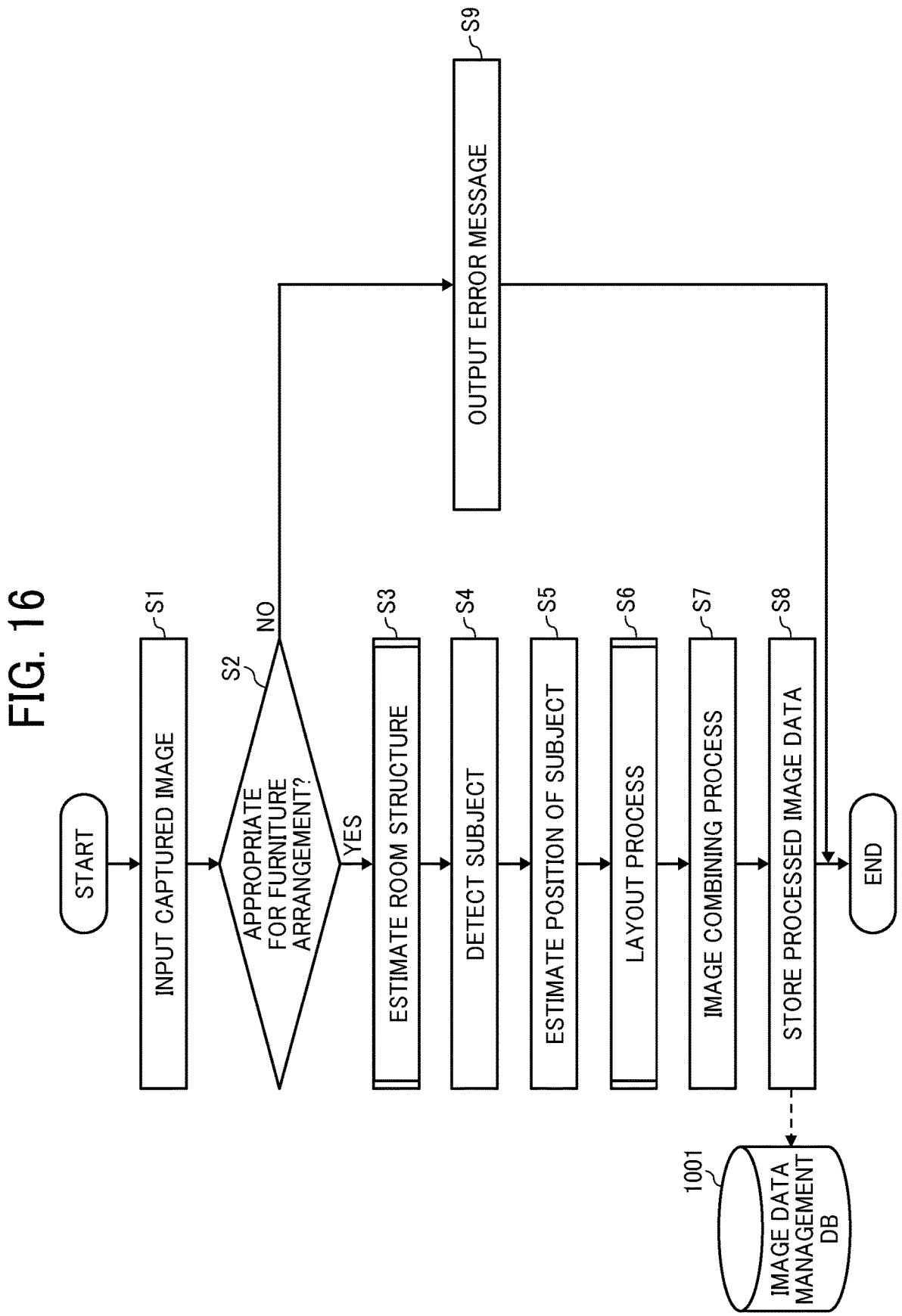
FIG. 16 is a flowchart presenting an example of processing by the image processing device.

Processes or operations of the image display system 1 according to the embodiment are described with reference to FIGS. 16 to 43. Referring to FIGS. 16 to 32, an image combining process by the image processing device 10 is described. In the following description, an example of a room that is a real estate property is described as an example of a space inside a construction, and an example of furniture arranged in the room is described as an example of a virtual object. FIG. 16 is a flowchart presenting an example of processing by the image processing device 10.

The image processing device 10 accepts an input of a captured image obtained by imaging a predetermined room that is an example of a space inside a construction (step S1). More particularly, the transmitting and receiving unit 11 of the image processing device 10 receives a captured image of a space inside a predetermined construction imaged by the imaging device 70, from the imaging device 70 via the communication network 5.

Alternatively, the image processing device 10 may accept an input of a captured image to be processed from the imaging device 70 when performing the image combining process. Still alternatively, the image processing device 10 may store a captured image, which has been received from the imaging device 70 in advance, in the memory 1000 and reads the stored captured image when performing the image combining process.

The image processing device 10 may be directly coupled with the imaging device 70 via the external device connection I/F 108 and may accept an input of a captured image using the input unit 21. In some cases, the imaging device 70 does not have a communication function. An input of a captured image does not have to be directly accepted from the imaging device 70. The image processing device 10 may accept an input of a captured image via a predetermined communication device owned by a real estate agent.

Then, the first determination unit 13 determines whether furniture arrangement with respect to the room appearing in the captured image is appropriate using the captured image input in step S1 (step S2). For example, the room appearing in the captured image is desirably an empty room without furniture or a room having a certain space for arranging furniture. Hence, the first determination unit 13 determines that the room appearing in the captured image is not appropriate for furniture arrangement when the first determination unit 13 determines that the room appearing in the captured image is a space outside a construction such as an outdoor space, or the room appearing in the captured image does not have a furniture arrangement space because the room is very small or an object is placed.

When the first determination unit 13 determines that the room appearing in the captured image is appropriate for furniture arrangement (YES in step S2), the processing goes to step S3. In contrast, when the first determination unit 13 determines that the room appearing in the captured image is not appropriate for furniture arrangement (NO in step S2), the processing goes to step S9. In step S9, the image processing device 10 does not execute the image combining process and outputs an error message indicating that the room appearing in the captured image is not appropriate for furniture arrangement.

More particularly, the storing and reading unit 29 of the image processing device 10 associates the captured image input in step S1 with the error message and stores the captured image in the memory 1000. Accordingly, a viewer who views the captured image can recognize the error message together with the captured image.

In one example, the image processing device 10 may execute the processing in step S3 and later after the image processing device 10 outputs the error message. In this case, however, a situation may possibly occur in which furniture to be arranged is not present in the image combining process in step S7 (described later) and processed image data to be stored in step S8 (described later) possibly results in an image without furniture.

Then, the structure estimation unit 14 estimates a structure of the room appearing in the captured image using the captured image input in step S1 (step S3). A known method of estimating a structure of a room is, for example, a method of detecting straight lines of a subject appearing in a captured image by image processing, obtaining a vanishing point of the detected straight lines, and estimating the structure of the room from the boundary of the floor, wall, or ceiling.

When a spherical image is used, the ceiling, floor, and wall that are elements required for estimating the structure of the room are imaged. Thus, using a spherical image provides a higher reliability of structure estimation than a case of a typical planar image in which only part of a room is imaged and it is difficult to estimate the structure of the room based on detection other than detection of a vanishing point. Another known method is a method of using machine learning for detection of a vanishing point, detection of a boundary between the floor and the wall or between the ceiling and the wall, or estimation of a three-dimensional structure based on the detection result. The structure estimation unit 14 may execute structure estimation using any of known methods.

Figure 17:
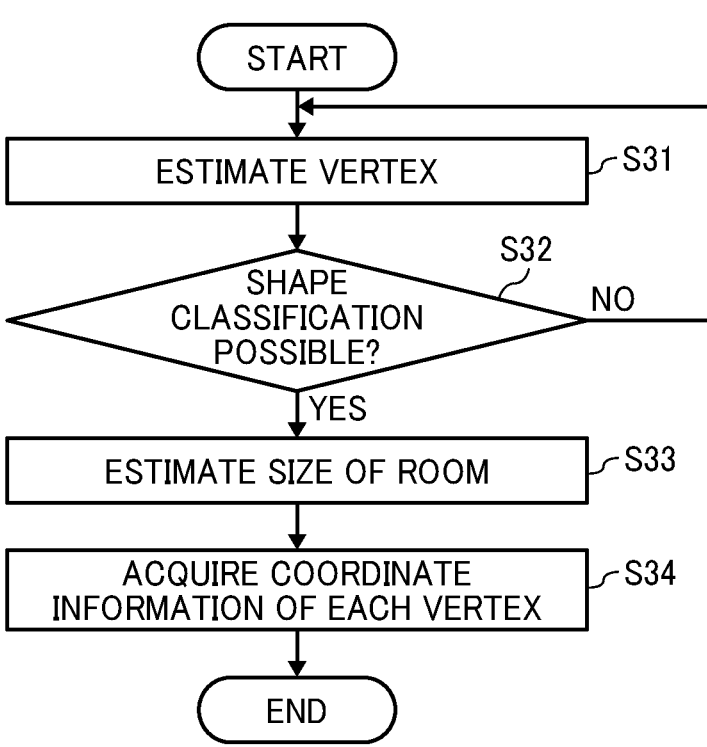
FIG. 17 is a flowchart presenting an example of a structure estimation process.

An example of a structure estimation process by the image processing device 10 is described in detail with reference to FIGS. 17 to 20. FIG. 17 is a flowchart presenting the example of the structure estimation process.

The structure estimation unit 14 estimates a vertex of a space appearing in a captured image using the captured image (step S31). More particularly, the structure estimation unit 14, for example, detects lines of a subject appearing in a captured image by image processing on the captured image as described above, and estimates a vanishing point calculated from the detected lines as a vertex of the space.

Figure 18:
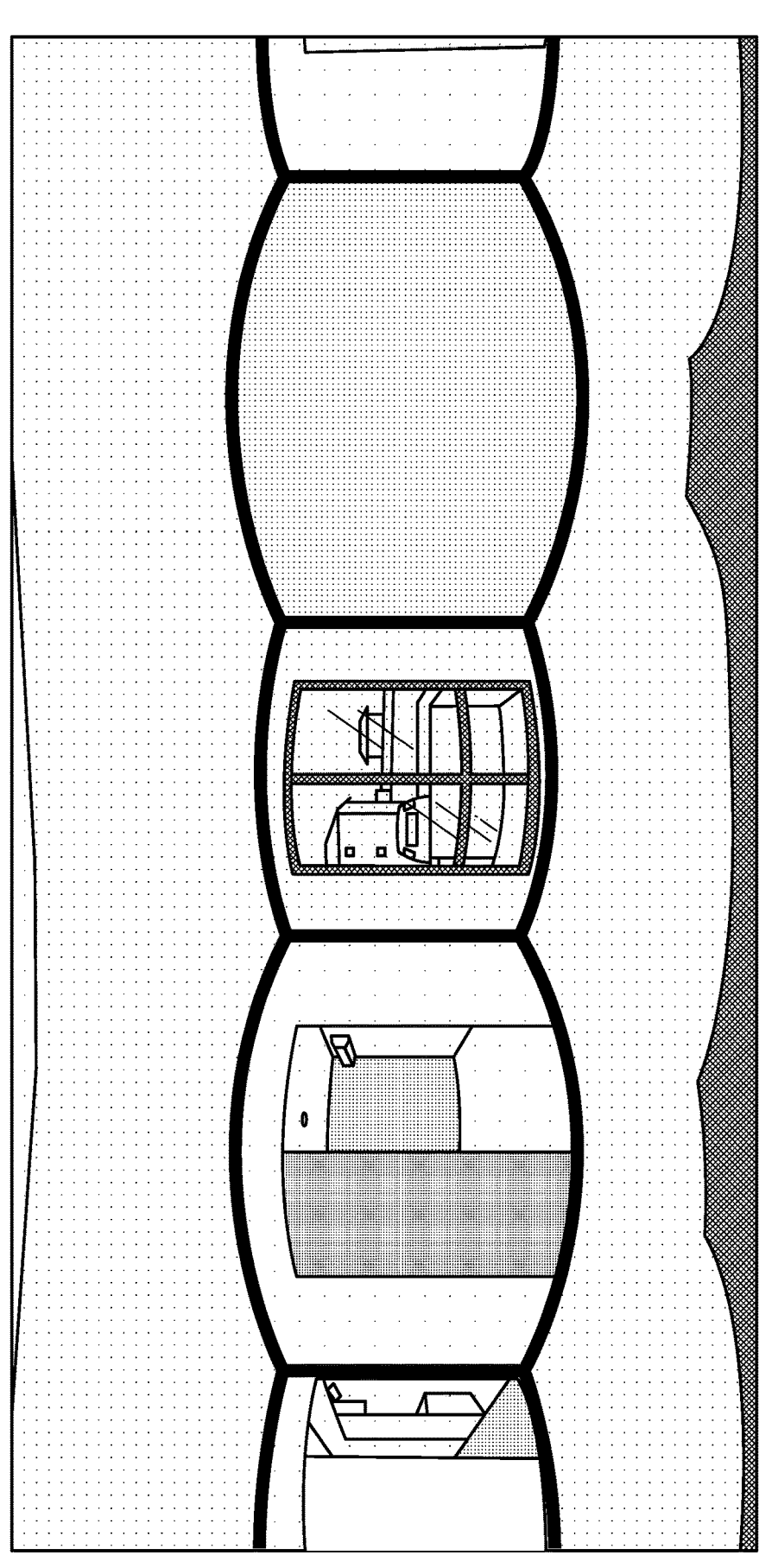
FIG. 18 illustrates an example of a structure estimation result on a captured image.

FIG. 18 illustrates an example of a structure estimation result on a captured image. FIG. 18 illustrates an example of a room structure expressed by equidistant cylindrical projection. As described above, a vertical line is projected as a straight line and a horizontal line is projected as a curved line by equidistant cylindrical projection. When such lines are applied to structures of rooms, in many cases of rooms, straight lines orthogonally intersect with one another. Since the structure estimation unit 14 uses an image expressed by equidistant cylindrical projection, the structure estimation unit 14 can estimate a rough structure of a room. The structure estimation unit 14 detects elements and lines constituting a room, and planes including the elements and lines to estimate a rough structure of a room. The example in FIG. 18 illustrates an example when a rectangular-parallelepiped room is imaged. The structure estimation unit 14 estimates four planes in the horizontal direction and two upper and lower planes.

Figure 19:
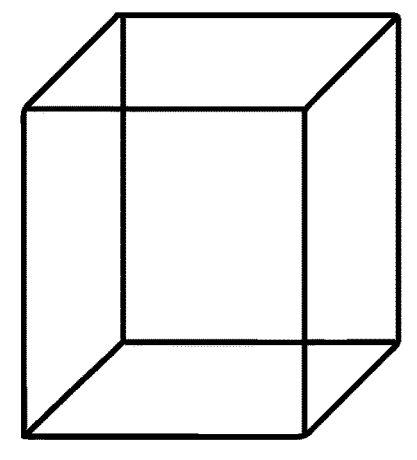
FIG. 19 illustrates examples of a shape of a space structure estimated by the structure estimation process.
Figure 19:
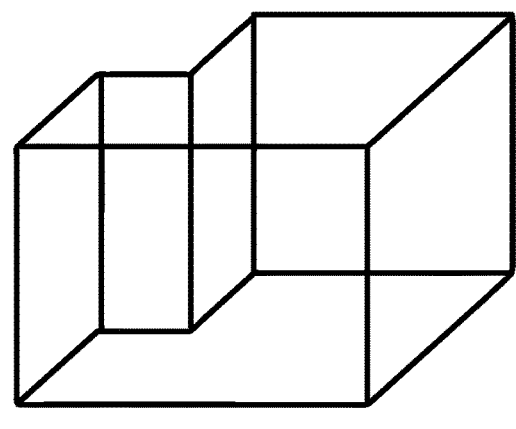

Then, when the structure estimation unit 14 is possible to classify the shape of the room based on the estimation result of the vertex in step S31 (YES in step S32), the processing goes to step S33. In contrast, when the structure estimation unit 14 is not possible to classify the shape of the room (NO in step S32), the processing in step S31 is continued. FIG. 19 illustrates examples of a shape of a space structure estimated by the structure estimation process. Actual rooms have various shapes. To obtain detailed three-dimensional information, measurement with a laser scanner or a total station is required. However, such measurement is a troublesome and expensive process.

When furniture is virtually arranged, the shape of the room does not have to be recovered in detail, and a simplified shape of a room with reduced conditions is enough. That is, figuring out a rough structure of a room is enough. The structure estimation unit 14 reduces conditions by using, for example, an assumption (Manhattan World Assumption) in which a room is constituted of straight lines and planes and the straight lines basically intersect with one another at 90°. Furthermore, to recover a shape to a certain extent that furniture can be arranged, the structure estimation unit 14 classifies a shape of a room as, for example, a rectangular-parallelepiped room having 8 vertices or an L-shaped room having 12 vertices as illustrated in FIG. 19.

Then, the structure estimation unit 14 estimates the size (scale) of the space appearing in the captured image (step S33). More particularly, the structure estimation unit 14 acquires coordinates of each vertex of the room based on equidistant cylindrical projection, using the methods in step S31 and step S32. The structure estimation unit 14 converts the acquired coordinates based on equidistant cylindrical projection into coordinates in a three-dimensional space.

The structure estimation unit 14 detects whether the imaging device 70 is vertically installed, or detects a gravitational acceleration direction and performs correction. The structure estimation unit 14 assumes that the south pole based on equidistant cylindrical projection (for example, PL1 indicated in FIG. 9A) coincides with the gravitational acceleration direction and meets the Manhattan World Assumption to estimate the structure of the room.

Figure 20:
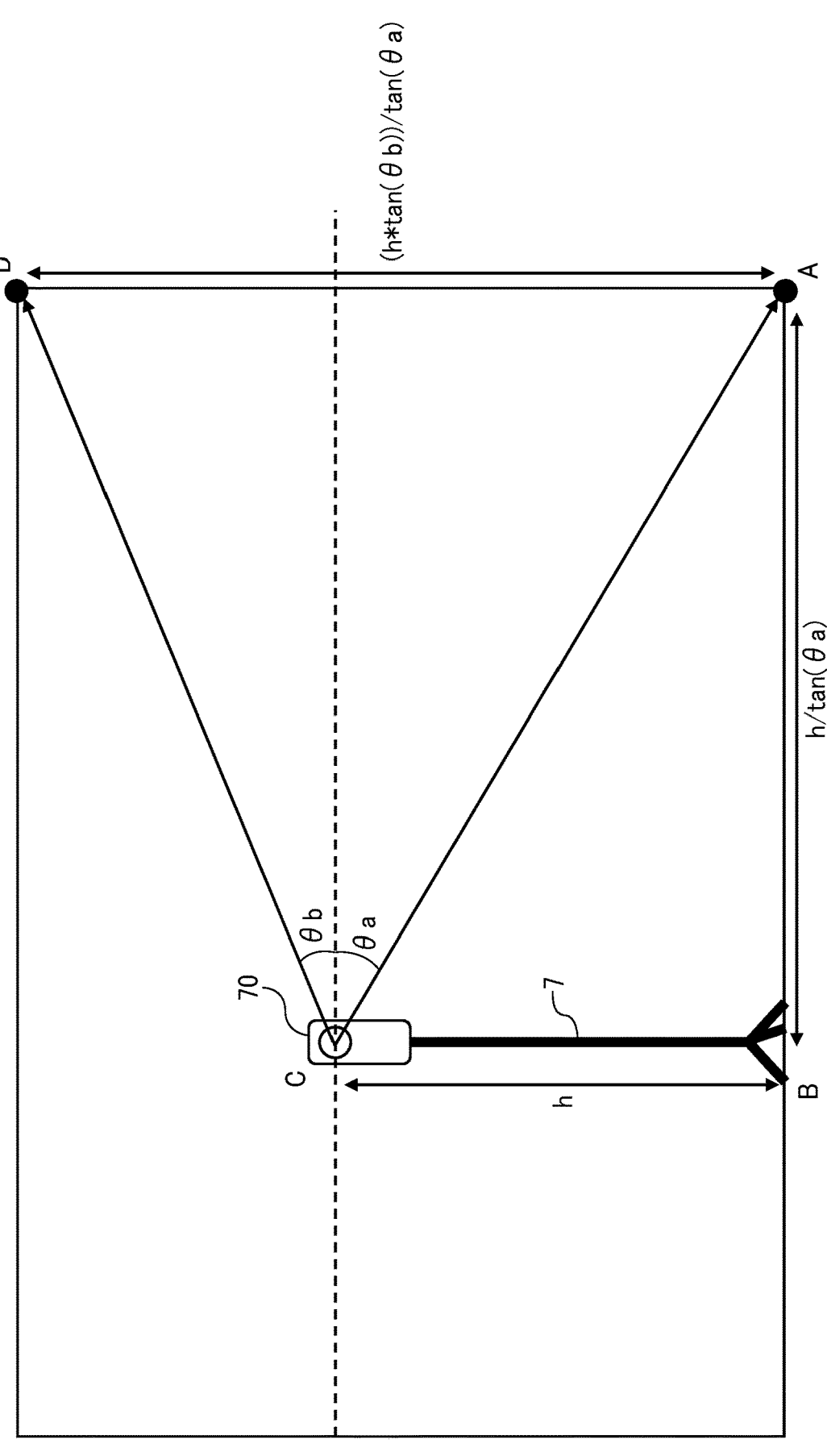
FIG. 20 illustrates an example of a method of calculating the size of a space by the structure estimation process.

The Manhattan World Assumption is an assumption in which many artificial objects made by humans are made in parallel to the orthogonal coordinate system. With the assumption, restrictions are assumed such that a wall, a ceiling, or the like is parallel to the x, y, and z directions. According to such an assumption, when the height of the imaging device 70 from the floor is h as illustrated in FIG. 20, the distance from the point A that is the boundary between the floor and the wall to the point B that is the boundary between the ceiling and the wall can be expressed by using the installation height h of the imaging device 70. This method gives a rough shape of the room but does not give a correct size (scale). In a particular example, it is hardly figured out whether the room is a miniature with a height of 20 cm or the room has a size of 2 m of a typical room. It is desirable to recognize the scale of a room to a certain extent for arranging furniture.

As a method of calculating the scale of a room, the structure estimation unit 14 uses Expression (3) described above and expressed in FIG. 8 to calculate the point A located at the depression angle θ while the installation height h of the imaging device 70 is assumed as a given height. Moreover, as a method of measuring an installation height of the imaging device 70 by a physical measure, the structure estimation unit 14 may measure the distance to the optical center of the imaging device 70 by laser ranging. Furthermore, as a method of measuring the installation height of the imaging device 70 by image processing, the structure estimation unit 14 may prepare a measurement scale with a given length on the floor and images the measurement scale using the imaging device 70 to measure the distance to the measurement scale.

The structure estimation unit 14 may estimate the scale of a room while the room is assumed to have a given height. The height of the room is determined to be equal to or higher than 210 cm in terms of ceiling height under the Building Standards Law in Japan. The ceiling height of a typical apartment building is in a range from 240 cm to 250 cm. The ceiling height in the United States is about 8 feet (243 cm), and is close to that in Japan. Although the height of the room varies, as long as the variation is about ±10 cm, the variation in the accuracy of the scale is 5% or less. The scale works as a rough scale.

As a method of measuring the distance to an object in stereo view, the structure estimation unit 14 may utilize the presence of a disparity of the optical center of a plurality of lenses included in the imaging device 70 to measure the distance to a predetermined object using common portions of the lenses.

As a method of estimating a scale using so-called structure from motion for estimating a three-dimensional structure from a plurality of images and inertial measurement unit (IMU) data, since the movement distance can be roughly estimated from the IMU data of the imaging device 70, the structure estimation unit 14 may estimate the scale based on the value of the roughly estimated movement distance.

The structure estimation unit 14 may use any of the above-described methods as the method of calculating the scale of the room in step S33.

The structure estimation unit 14 acquires coordinate information on each vertex based on the structure of the room estimated in step S31 to step S33 (step S34). The structure estimation unit 14 acquires coordinate information on each of n pieces (n=8 or 12) of vertices of the room as a result of a series of processes. The structure estimation unit 14 acquires, for example, coordinates Cn (Cn=((x0, y0, z0), (x1, y1, z1), . . . (xn, yn, zn))) expressed in the XYZ coordinates as illustrated in FIG. 10B while the optical center of the imaging device 70 serves as the origin. Alternatively, the structure estimation unit 14 may acquire coordinates of polar coordinates indication as illustrated in FIG. 10A.

As described above, the structure estimation unit 14 can estimate a rough structure of a room appearing in a captured image by using a captured image input to the image processing device 10.

Figure 21:
FIG. 21 illustrates an example of an image when arrangement of a virtual object is failed.

Referring back to FIG. 16, the detection unit 15 of the image processing device 10 detects a subject present in the room appearing in the captured image input in step S1 (step S4). In some cases, the image processing device 10 is not able to appropriately arrange furniture although the structure of the room is acquired. FIG. 21 illustrates an example of an image when arrangement of a virtual object is failed. As illustrated in FIG. 21, furniture may be arranged at a position that is not appropriate for actual arrangement of furniture such as when a bed is arranged in a passageway of the room. To provide a natural layout of furniture, the image processing device 10 uses the detection unit 15 to detect a subject appearing in the captured image, and estimates a natural arrangement allowable position of furniture.

A subject to be detected by the detection unit 15 is an object related to the layout of a room among objects in the structure of the room appearing in the captured image such as objects fitted in the room, that is, objects fitted in the room in advance. Examples of a subject to be detected by the detection unit 15 include a door, a window, a frame, a sliding partition, an electric switch, a closet, a recessed storage space, a kitchen, a passageway, an air conditioner, an electric outlet, a socket for illumination, a fireplace, a ladder, stairs, and a fire alarm.

Figure 22:
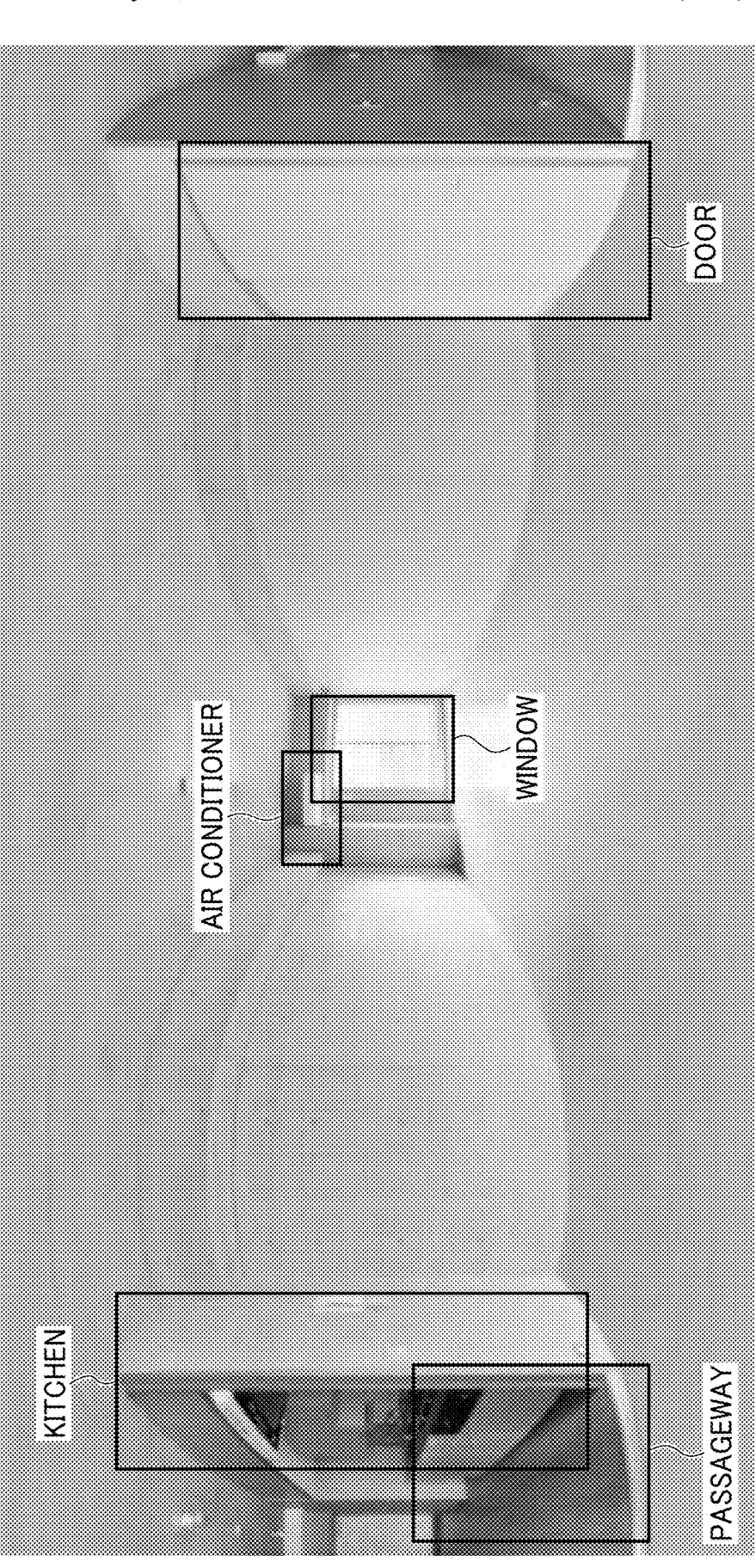
FIG. 22 illustrates an example of a subject detection result on a captured image.

As a method for detecting a subject appearing in an image, many object detection algorithms are known through development of machine learning. Representative methods include expressing a detection result of a subject using a rectangle (bounding box). In another example, a method called semantic segmentation that indicates a subject using a region can detect a subject with higher accuracy. The detection unit 15 may use any of the above-described known methods as the method of detecting a subject in step S4. The detection unit 15 also detects the type of a subject appearing in an image by a known method. The type of a subject appearing in an image is, for example, information for identifying what the subject appearing in the image is (for example, whether the subject is a door or a window). FIG. 22 illustrates an example of a subject detection result on a captured image. FIG. 22 presents a detection result when the detection unit 15 detects a kitchen, an air conditioner, a window, a door, and a passageway from among subjects appearing in a captured image.

In this way, the image processing device 10 uses the input captured image to estimate the structure of the room appearing in the captured image and to detect a subject appearing in the captured image. Thus, the image processing device 10 can estimate the state of the room in the captured image. The image processing device 10 detects a subject based on the structure of the room estimated in step S3. Hence, the image processing device 10 can estimate an area in which the subject is possibly fitted in the structure of the room. Thus, the image processing device 10 can increase processing efficiency. The image processing device 10 may execute the processes in step S3 and step S4 in parallel, or the order of step S3 and step S4 may be inverted.

Then, the position estimation unit 16 of the image processing device 10 estimates the position of the subject detected in step S4 inside the room (step S5). The detection result of the subject is expressed in a form of a rectangle when bounding box is used, or expressed in a form of pixels filled in the corresponding area when semantic segmentation is used. Such expressions are provided on a unit sphere of the imaging device 70 as illustrated in FIG. 23A. Alternatively, such expressions may be provided based on equidistant cylindrical projection as illustrated in FIG. 22. The position estimation unit 16 projects the detection result of the subject on the unit sphere illustrated in FIG. 23A in a form of a three-dimensionally reconfigured room. The position estimation unit 16 projects, for example, a subject typically present in or along a wall, such as a door, a window, or a passageway illustrated in FIG. 23B in the structure of the room estimated by the structure estimation unit 14 among the detected subjects.

In this case, the position estimation unit 16 projects a virtual object corresponding to the type of the subject detected by the detection unit 15. The position estimation unit 16 arranges a virtual object serving as a light source at the detected position of the window, and combines an image of the virtual object arranged by the image processing unit 20 (described later). Thus, external light or the like entering the room can be more naturally expressed. In this way, the position estimation unit 16 estimates the position of a subject in the structure of a room and allocates the position.

The estimated position of the subject in the structure of the room by the position estimation unit 16 is not necessarily correct. In the case of subject detection based on equidistant cylindrical projection, a deviation from the position of the actual subject occurs. However, the result of subject detection indicates a size slightly larger than that of the actual subject, and there is a margin provided for estimation of an arrangement allowable region of furniture (described later). Thus, the deviation of the position is not markedly disadvantageous in view of layout.

Then, the image processing device 10 executes a layout process of furniture (step S6). When a person actually lays out furniture, the person lays out the furniture based on the structure of a room and the position of a subject in the structure of the room. The layout of furniture performed by a person involves rough rules based on custom or the like. To automatically lay out furniture, there is known a method of layout under rules of layout of humans, or a method of optimizing layout through machine learning from many layout records in the past. The image processing device 10 lays out the furniture under a simple rule for the structure of the room estimated by the structure estimation unit 14 and the subject detected by the detection unit 15.

Figure 24:
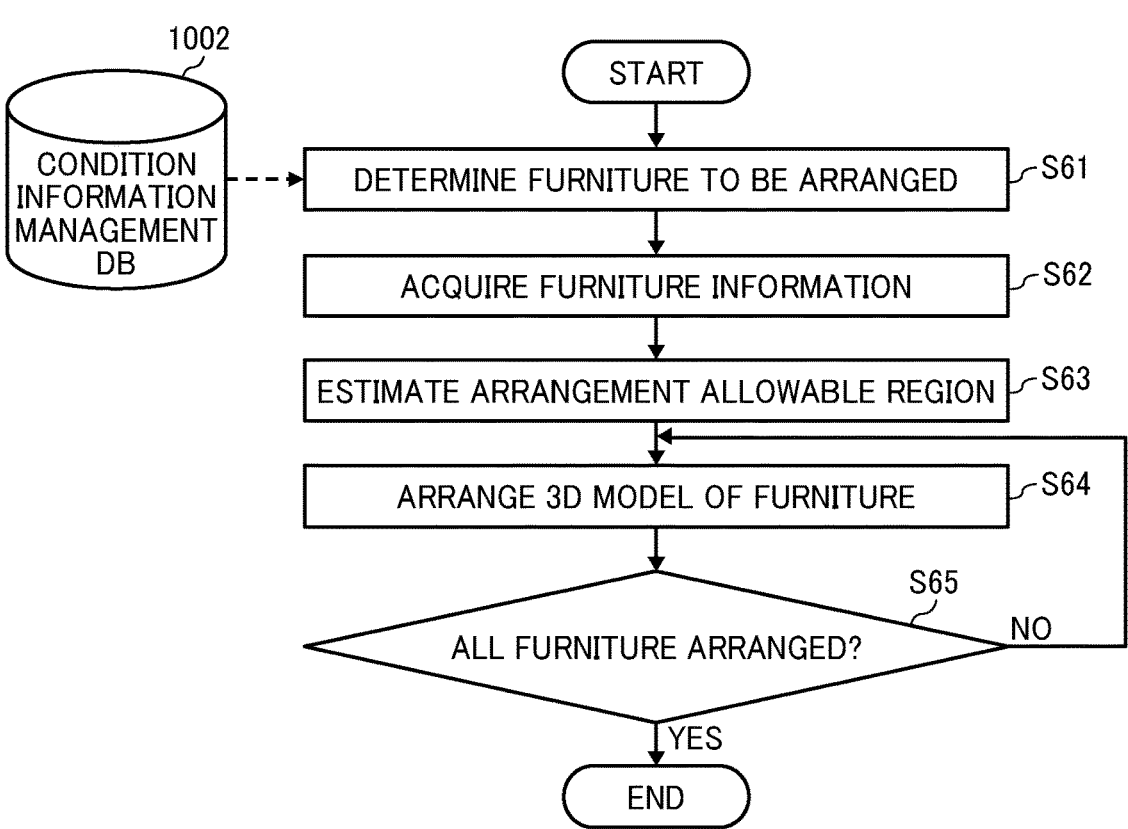
FIG. 24 is a flowchart presenting an example of a layout process of a virtual object.

An example of the layout process by the image processing device 10 is described in detail with reference to FIGS. 24 to 29. FIG. 24 is a flowchart presenting an example of the layout process of a virtual object. FIG. 24 presents a process of determining pieces of furniture to be arranged in accordance with a purpose of a room, and automatically sequentially arranging the pieces of furniture in arrangement allowable regions.

The second determination unit 18 of the image processing device 10 determines furniture to be arranged (step S61). The second determination unit 18 determines the furniture to be arranged in accordance with the purpose and size of the room. More particularly, the second determination unit 18 determines the furniture to be arranged based on condition information stored in the condition information management DB 1002 and purpose information indicative of the purpose of the room. The purpose information is information that is designated by a real estate agent or the like who has imaged a target room. In the image processing device 10, the transmitting and receiving unit 11 receives, for example, purpose information transmitted from an external device such as the imaging device 70. The purpose information may be input to the image processing device 10 together with the captured image input in step S1, or may be information directly designated to the image processing device 10.

In this case, the purpose information includes, for example, the purpose of a room and the size of the room. The purpose of the room is a purpose of use of the room. For example, the purpose of the room is a classification such as a living room, a bedroom, or a children's room. It is generally difficult to determine the purpose of a room based on the state of the room. Hence, the purpose is desirably selectable based on the intension of a user such as a real estate agent who has imaged the room. Alternatively, the purpose of a room may be estimated as a living room when the room is wide and includes a kitchen, or may be estimated as a bedroom when the room includes a few windows. In other words, the structure estimation unit 14 may automatically estimate the purpose of a room in accordance with the structure of the room appearing in a captured image and a subject.

The layout of furniture varies and the type of furniture to be arranged varies depending on tastes and preferences of an individual and a culture area. It is desirable to present a room beautiful for the purpose of home staging, and hence an aesthetic viewpoint is requested. There are various arrangement patterns for the layout of furniture. The type of furniture is determined based on various factors such as the purpose of use of a room, the size of the room, the style of furniture, the season, and color coordination.

The second determination unit 18 searches the condition information management DB 1002 (see FIG. 15) while using the purpose information as a search key to read condition information associated with the same purpose and size as those of the purpose information. The second determination unit 18 selects a piece of furniture to be arranged from among pieces of furniture indicated in the furniture information stored in the memory 1000 or transmitted from the communication terminal 80, based on the style of furniture or the furniture set indicated in the read condition information.

In the example illustrated in FIG. 15, condition information defines a furniture set that differs depending on the purpose of a room and the size of the room. For example, living rooms and bedrooms are classified into three levels (large (L), medium (M), and small (S)) depending on the sizes of the rooms. For example, a furniture set for a large room involves definition of a dining table and a relatively large sofa, and a furniture set for a small room involves definition of a single sofa and a table. The condition information defines the style of furniture instead of the furniture set. In this case, the second determination unit 18 selects a furniture set corresponding to the defined style of furniture from among pieces of furniture indicated in the furniture information stored in the memory 1000 or transmitted from the communication terminal 80. Examples of the style of furniture include a natural style, a pop style, a modern style, a Japanese style, a Nordic style, and an Asian style. The condition information may include information on color coordination or the season in addition to the furniture set or the style of furniture.

Then, the image processing device 10 acquires furniture information that is information on the furniture to be arranged determined in step S61 (S62). The furniture information includes data indicative of a 3D model of furniture, and furniture setting data indicative of a rule related to arrangement of furniture. More particularly, the storing and reading unit 29 of the image processing device 10 acquires the furniture information on the determined furniture by reading the furniture information stored in the memory 1000. The furniture information is transmitted from the communication terminal 80 owned by a furniture manufacturer or the like to the image processing device 10 and is stored in the memory 1000 in advance. Alternatively, the transmitting and receiving unit 11 of the image processing device 10 may receive furniture information transmitted from the communication terminal 80 in response to a request from the image processing device 10 to acquire the furniture information on the determined furniture in step S62.

Figure 25A:
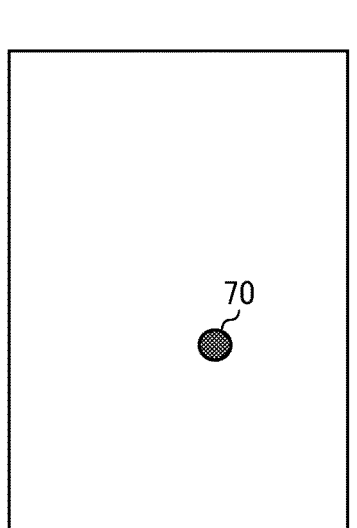
FIG. 25A illustrates an example of a layout algorithm of a three-dimensional (3D) model of furniture.
Figure 25B:
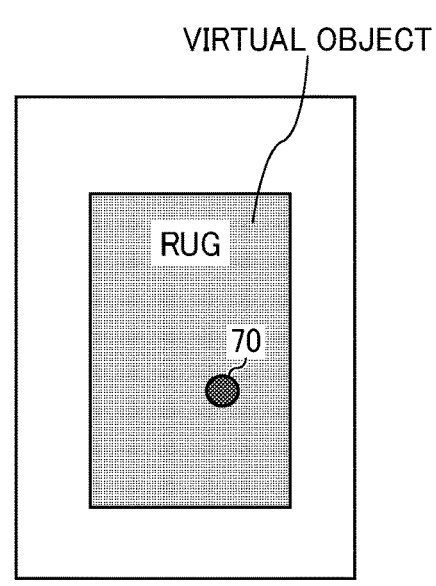
FIG. 25B illustrates the example of the layout algorithm of the 3D model of the furniture.

Then, the region estimation unit 17 estimates a region where furniture is allowed to be arranged based on the structure of the room estimated in step S3 and the position of the subject estimated in step S5 (step S63). An arrangement allowable region is described in detail with reference to FIGS. 25A to 26C. FIGS. 25A and 25B illustrate, as a particular example, a layout algorithm of a 3D model of a rug that is an example of furniture. FIG. 25A illustrates the position of the imaging device 70 and the structure of a room estimated by the structure estimation unit 14. FIG. 25B illustrates a state in which a rug is placed at the center of the room corresponding to an arrangement allowable region estimated by the region estimation unit 17. A rug or a carpet is put down on the floor. A rug or a carpet is furniture that can be arranged regardless of the position of a subject such as a door or a window as long as the structure of the room is figured out.

Figures 26A, 26B, 26C:
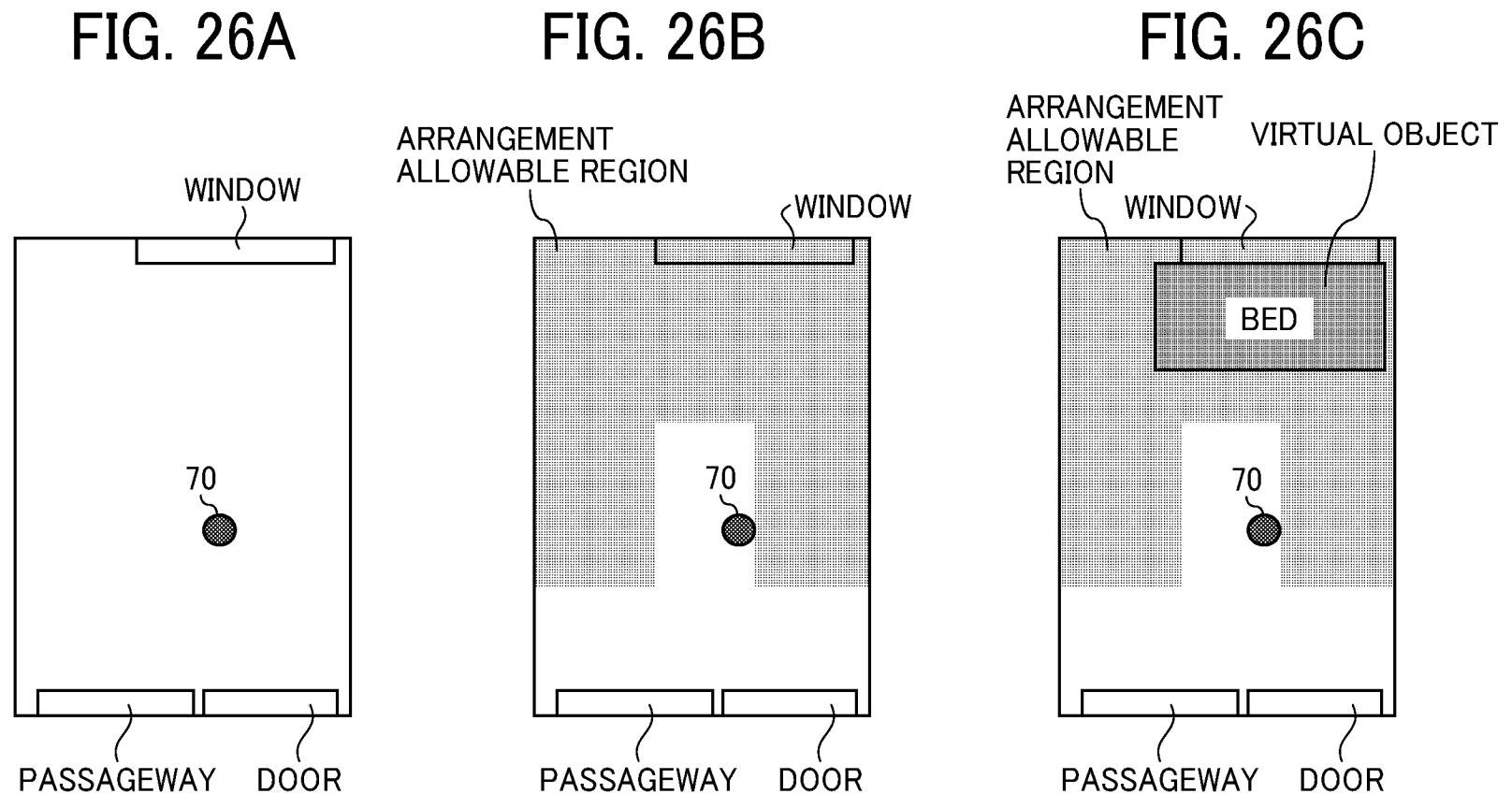

FIGS. 26A to 26C illustrate, as a more complicated case, a layout algorithm of a 3D model of a bed as furniture for which the state of a surrounding region is required to be recognized. FIG. 26A illustrates the position of the imaging device 70 and the structure of a room estimated by the structure estimation unit 14. FIG. 26B illustrates an arrangement allowable region estimated by the region estimation unit 17. FIG. 26C illustrates a state in which a bed is placed in the arrangement allowable region. Illustrated state is a state in which the rug is placed at the center of the room.

The region estimation unit 17 estimates an arrangement allowable region of target furniture based on basic rules for installation of furniture indicated in the furniture setting data acquired in step S62. Examples of the rules related to installation of a bed include placing a bed on the floor (not placing a bed in midair), placing a bed along a wall, and not placing a bed in a passageway or in front of a door (a bed may be placed in front of a window). The region estimation unit 17 estimates the arrangement allowable region of the bed as illustrated in FIG. 26B based on the structure of the room estimated by the structure estimation unit 14 and the position of the subject detected by the detection unit 15.

The rules related to installation of a bed also include sub-rules including, for example, randomly arranging a bed, arranging a bed at a corner of a room, and arranging a bed at the center of a side of the room. The region estimation unit 17 determines the position at which the bed is arranged based on the arrangement allowable region and the sub-rules. When a piece of furniture is not able to be arranged due to the rule indicated in the furniture setting data, the region estimation unit 17 stops arrangement of the furniture, and arranges another piece of furniture.

Then, the arrangement unit 19 of the image processing device 10 determines arrangement of a 3D model of furniture based on the furniture information acquired in step S63 (step S64). There are various file formats for 3D models of furniture, such as 3ds.max, .blend, .stl, and .fbx. Any of the file formats may be used. The installation direction and center position of a 3D model of normal furniture are not defined. Rules for an initial installation direction and an initial center point are desirably set, and a 3D model is desirably edited under the set rules, or data is desirably prepared for additional conversion. The rules for the installation direction and center point of furniture may be included in the furniture setting data or may be set as an additional database when a 3D model is selected.

Figure 27:
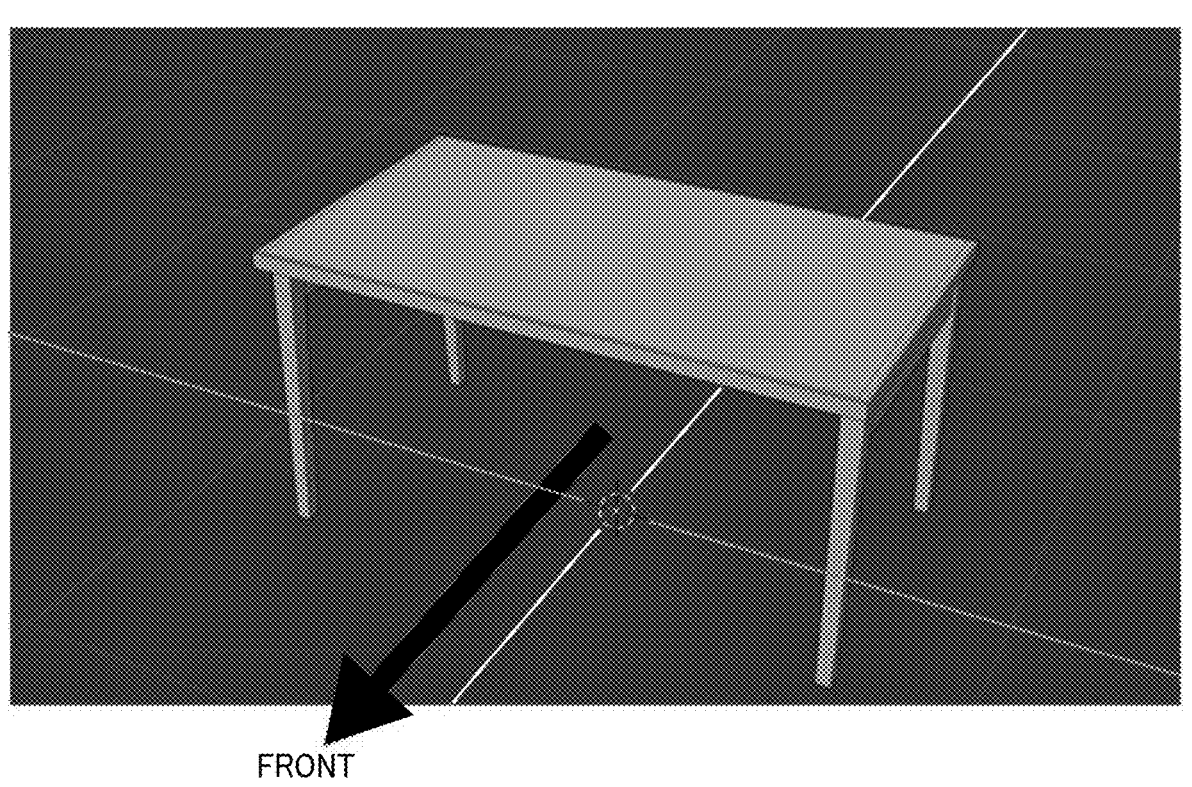
FIG. 27 illustrates an example of a 3D model of furniture.

FIG. 27 illustrates an example of a 3D model of furniture. The 3D model of a table illustrated in FIG. 27 has coordinates (0, −1, 0) in a virtual space as a front surface, and a direction in which a person faces is set at the front surface. In the 3D model of the table illustrated in FIG. 27, the center of a surface facing the floor is defined as the center of the furniture. The center of the furniture is determined with reference to a surface of the furniture in contact with the ground. For example, the center of a light hung from the ceiling is a point at which the light is in contact with the ceiling.

Figure 28:
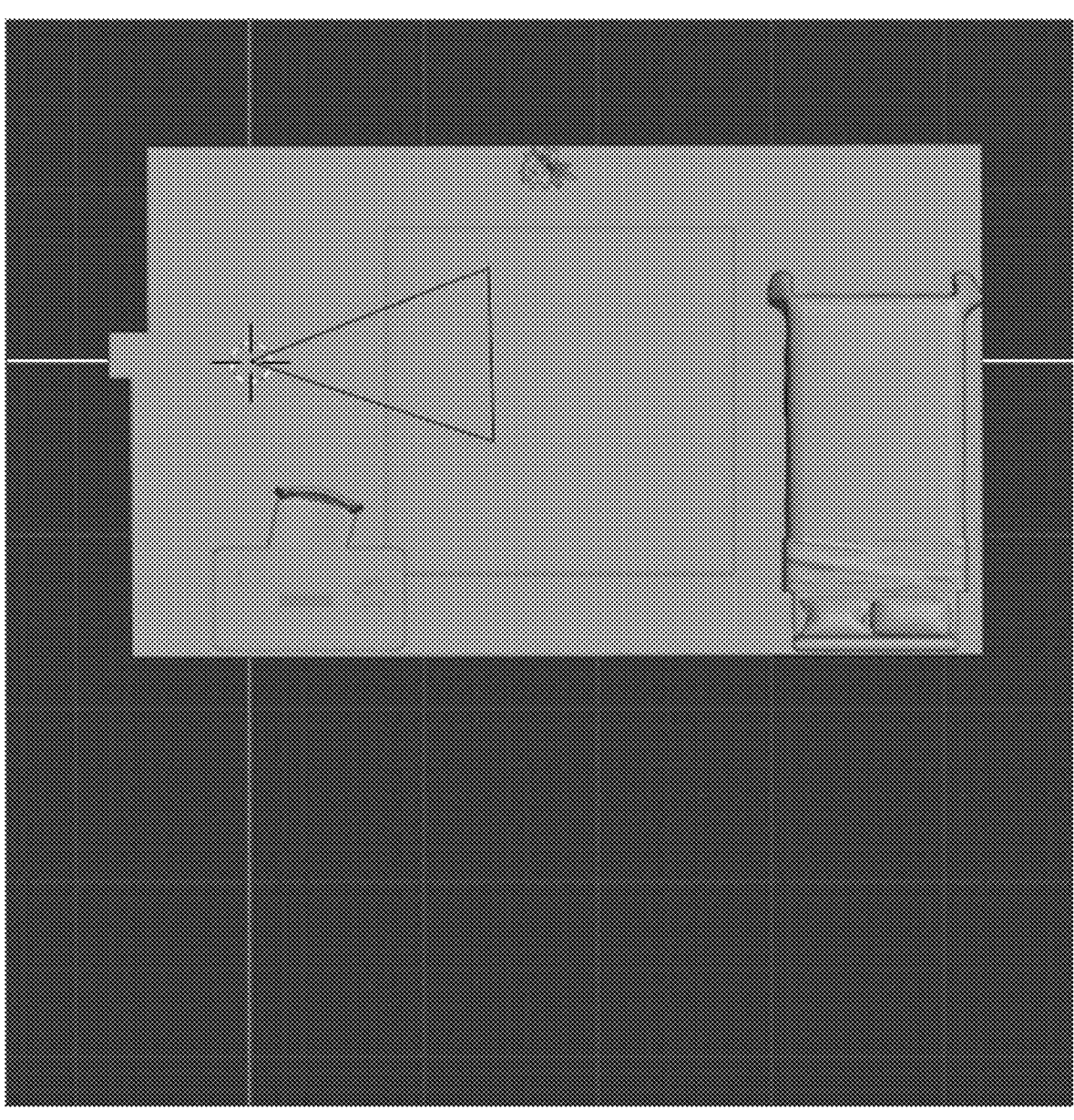
FIG. 28 illustrates an example of a layout result of 3D models of furniture.

FIG. 28 illustrates an example of a layout result of a 3D model of furniture. The arrangement unit 19 calculates the coordinates and orientation as the arrangement position of the furniture based on the arrangement allowable region estimated in step S62 and the arrangement rule indicated in the furniture setting data. Accordingly, the arrangement unit 19 can determine the arrangement of the furniture determined in step S61. In this case, layout information indicative of the arrangement of the furniture determined by the arrangement unit 19 includes the type of furniture, and the orientation, position, and size of furniture.

When arrangement of all furniture determined in step S71 is completed (YES in step S65), the arrangement unit 19 ends the processing. In contrast, when arrangement of all furniture determined in step S71 is not completed (NO in step S65), the arrangement unit 19 repeats the process in step S74 until arrangement of all furniture is completed. Regarding the order of arrangement of furniture, more pieces of furniture can be arranged as arrangement is started from larger one.

As described above, the image processing device 10 can automatically arrange a 3D model of furniture suitable for the purpose in accordance with the purpose of the room in the captured image. The image processing device 10 arranges the 3D model of the determined furniture in the arrangement allowable region estimated based on the estimated structure of the room and the detected position of the subject. Accordingly, more natural arrangement of furniture can be provided to a viewer.

Referring back to FIG. 16, the image processing unit 20 of the image processing device 10 executes an image combining process of combining the captured image input in step S1 with the 3D model of the furniture arranged in step S6 (step S7). More particularly, the image processing unit 20 executes rendering using the captured image input in step S1, the structure of the room estimated in step S3, and the layout information on the furniture in step S6. Rendering uses, for example, a computer graphics (CG) tool such as 3dsMax, Blender, Maya, any of various computer-aided design (CAD) tools, Unity, or a Web browser. Rendering desirably uses a tool having a function of making a CG tool operable with a script. Moreover, rendering is desirably executed in the form of equidistant cylindrical projection. However, rendering may be executed by partial perspective projection or a projection method using conversion. Furthermore, rendering may be any of rasterizing and ray tracing. Ray tracing is more desirable in view of increasing quality.

Figure 29:
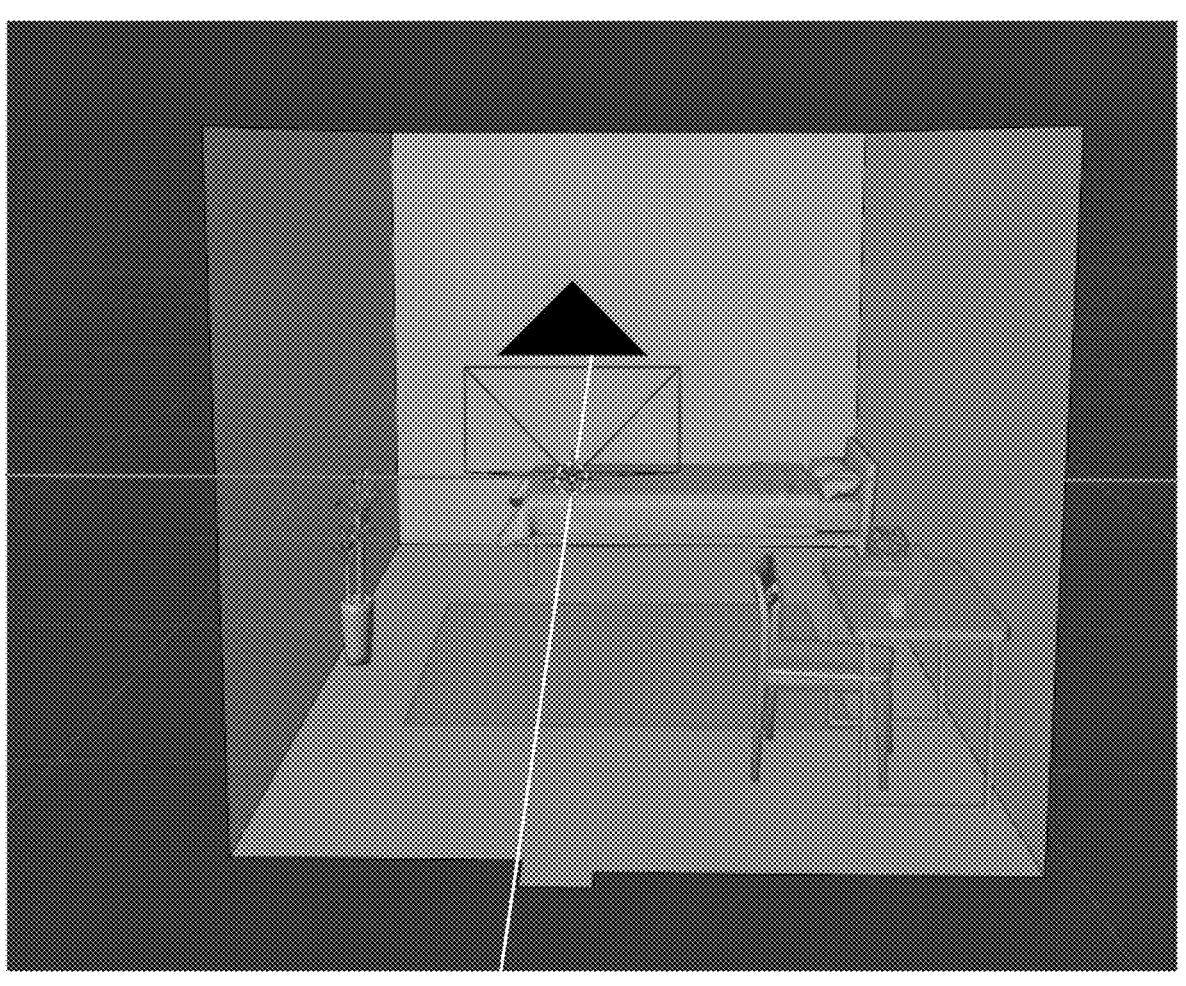
FIG. 29 illustrates an example of a layout result of 3D models of furniture in a 3D space model.

The arrangement unit 19 arranges the 3D model of the furniture on the CG tool based on the layout result in step S6. FIG. 29 illustrates an example of a layout result of a 3D model of furniture in a 3D space model. The layout information on the furniture includes the type of furniture, and the orientation, position, and size of the furniture as described above. The image processing unit 20 arranges the 3D model of the furniture decoded and designated based on the script on the CG tool, in a 3D space. The layout information on the furniture may include correction information for the 3D model of the furniture, such as the color or texture of the furniture. The example in FIG. 29 is an example in which a bed, a rug, a desk, and a leafy plant are arranged in the 3D space.

The arrangement unit 19 may express all or part of the structure of the room estimated in step S3 on the CG tool. The structure of the room, that is, the floor, ceiling, and wall may be expressed with texture or may be expressed transparent. The example in FIG. 29 expresses structures except the nearest wall and ceiling. When transparent expression is employed, the image processing unit 20 sets the transparent surface to function as a shadow catcher, renders shadow, and hence increases the texture of CG. The image processing unit 20 executes a process of combining the 3D model arranged by the arrangement unit 19 with the captured image input in step S1.

Figure 30:
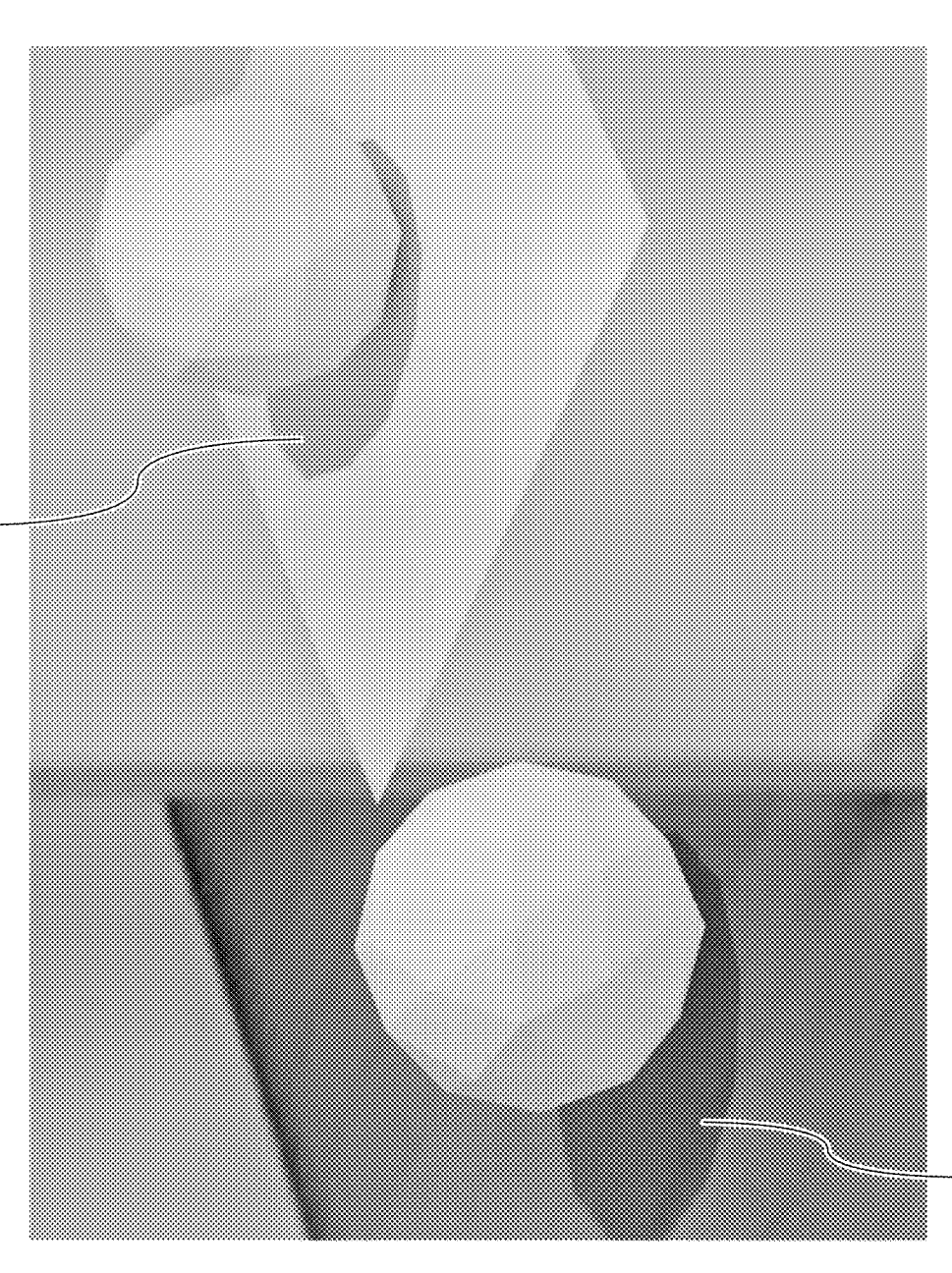
FIG. 30 illustrates an example of a processed image using a shadow catcher.

FIG. 30 illustrates an example of a processed image using a shadow catcher. As illustrated in FIG. 30, the image processing unit 20 can cast a shadow where there is nothing, or can cast a shadow on a subject appearing in the captured image by using the shadow catcher function. In this way, the image processing unit 20 executes the rendering process and hence can keep constant shadow quality as a rendering image.

Figures 31A, 31B:
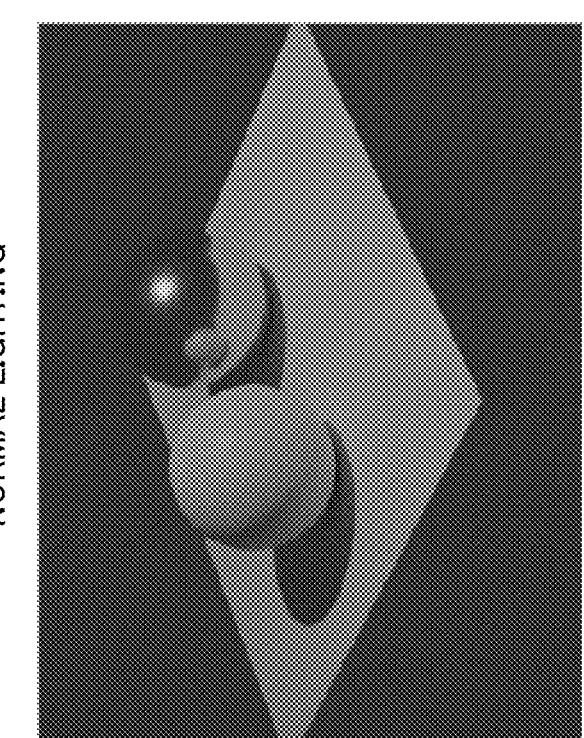
FIG. 31A illustrates an example of image processing using image based lighting.
FIG. 31B illustrates the example of the image processing using image based lighting.

FIGS. 31A and 31B illustrate an example of image processing using image based lighting. As illustrated in FIG. 31B, the image processing unit 20 sets a captured image as a data background of image based lighting. Thus, the image processing unit 20 can express more natural rays and increase texture as compared with normal lighting processing presented in FIG. 30A.

The storing and reading unit 29 stores processed image data combined in step S7 in the image data management DB 1001 (see FIG. 14) (step S8). In this case, the storing and reading unit 29 stores the processed image data combined in step S7 in the image data management DB 1001 in association with the captured image data before the combining process and a condition ID for identifying the selection condition of the furniture.

In this way, the image processing device 10 estimates the structure of a room and the position of a subject using an input captured image, and arranges a 3D model of furniture in an arrangement allowable region in accordance with the estimated results. Thus, the image processing device 10 can provide more natural arrangement of a virtual object.

Figure 32:
FIG. 32 illustrates an example of a space estimation result and a subject detection result provided in a processed image with a virtual object combined.

FIG. 32 illustrates an example of a space estimation result and a subject detection result on a processed image with a virtual object combined. In the example in FIG. 32, a dotted line indicates a space estimation result that is a structure of a room, and a thick line indicates a subject detection result. As illustrated in FIG. 32, the image processing device 10 can arrange furniture in an arrangement allowable region regarding the space estimation result and the subject detection result.

Referring to FIGS. 33 to 36, an application example of the image combining process by the image processing device 10 is described. A process of estimating an arrangement prohibited region for a virtual object such as furniture is described with reference to FIGS. 33 to 34B.

Figure 33:
FIG. 33 illustrates an example when a virtual object is too close to the imaging device.
Figure 34A:
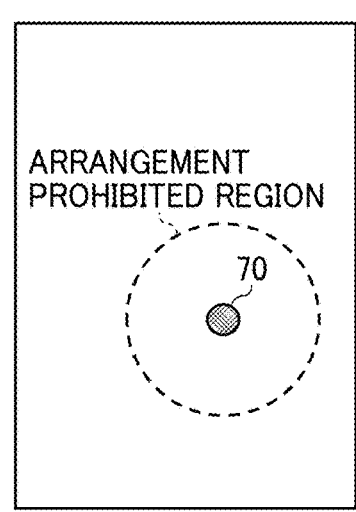
FIG. 34A illustrates an example of an arrangement prohibited region of a virtual object.
Figure 34B:
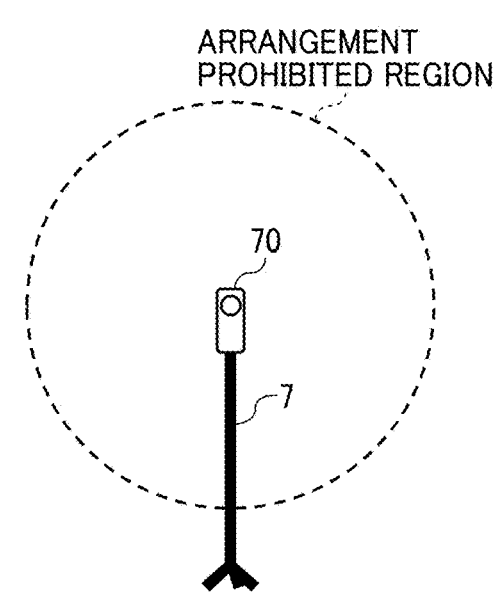
FIG. 34B illustrates the example of the arrangement prohibited region of a virtual object.

FIG. 33 illustrates an example when a virtual object is too close to the imaging device 70. As illustrated in FIG. 33, when the virtual object is arranged in the arrangement allowable region based on the structure of the room and the detection result of the subject as described above, the virtual object may be too close to the imaging device 70 and may result in poor appearance. To address the situation, as illustrated in FIGS. 34A and 34B, the image processing device 10 estimates a surrounding region of the imaging device 70 as an arrangement prohibited region where arrangement of a virtual object is prohibited, thereby improving an appearance of a processed image after image combining.

In this case, in above-described step S4, the detection unit 15 detects the position of the imaging device 70. In step S63, the region estimation unit 17 estimates a surrounding region of the imaging device 70 detected by the detection unit 15 as an arrangement prohibited region. The region estimation unit 17 estimates the arrangement allowable region of the virtual object with regard to the structure of the room estimated by the structure estimation unit 14, the position of the subject estimated by the position estimation unit 16, and the estimated arrangement prohibited region. The arrangement prohibited region may be two-dimensionally defined or three-dimensionally defined.

Figure 35A:
FIG. 35A illustrates an example of a captured image in which a support appears.
Figure 35B:
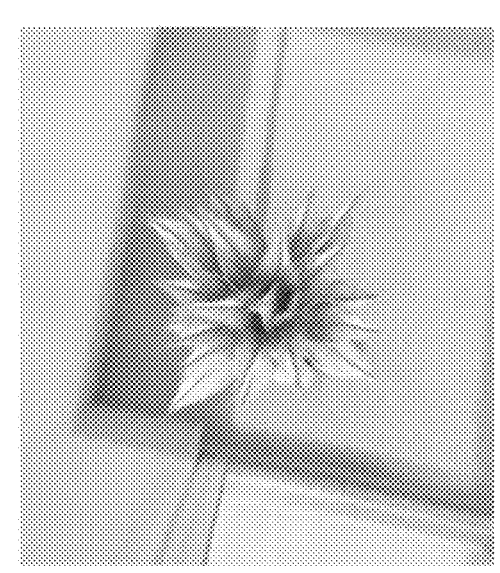
FIG. 35B illustrates an example of an image in which a virtual object is arranged on the appearing support.
Figure 36:
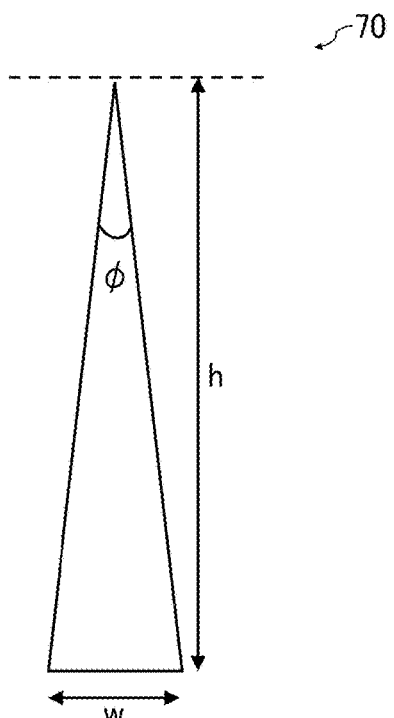
FIG. 36 illustrates an example of the size of the support.

A process of hiding a subject appearing in a captured image is described next with reference to FIGS. 35A to 36. FIGS. 35A to 36 provide an example in which the imaging device 70 or the support 7 appears in the captured image. As illustrated in FIG. 35A, the imaging device 70 images the surrounding in all directions. In the captured image captured by the imaging device 70, a hand of a person who captures an image and supports the imaging device 70 or the support 7 such as a monopod or a tripod appears. This is not desirable in terms of presenting the room beautiful. For example, the image processing device 10 detects the support 7 using the detection unit 15 and arranges a virtual object with any size that can hide the detected support 7. The image processing unit 20 of the image processing device 10 combines an image of the arranged virtual object with the captured image as a background. Accordingly, an appearance of the support 7 is addressed as illustrated in FIG. 35B.

FIG. 36 illustrates an example of the size of the support 7. The detection unit 15 detects the support 7 in step S4. The support 7 may be detected based on equidistant cylindrical projection or may be detected such that the vertical lower direction is converted through transparent projection. As a result, the detection unit 15 acquires a viewing angle φ of the support 7. As illustrated in FIG. 36, when h is an installation height of the imaging device 70 from the floor and w is a width of the support 7, the width w of the support 7 can be expressed as $w=2\ tan(\varphi/2)$. The arrangement unit 19 arranges a virtual object with any size that is equal to or larger than the width w on the floor, and the image processing unit 20 combines the image of the arranged virtual object with the captured image. Thus, the support 7 can be prevented from appearing. An object to be detected by the detection unit 15 is not limited to the support 7. The imaging device 70 or a person who performs imaging with the imaging device 70 may be detected, and any virtual object that hides the detected object may be arranged.

Figure 37:
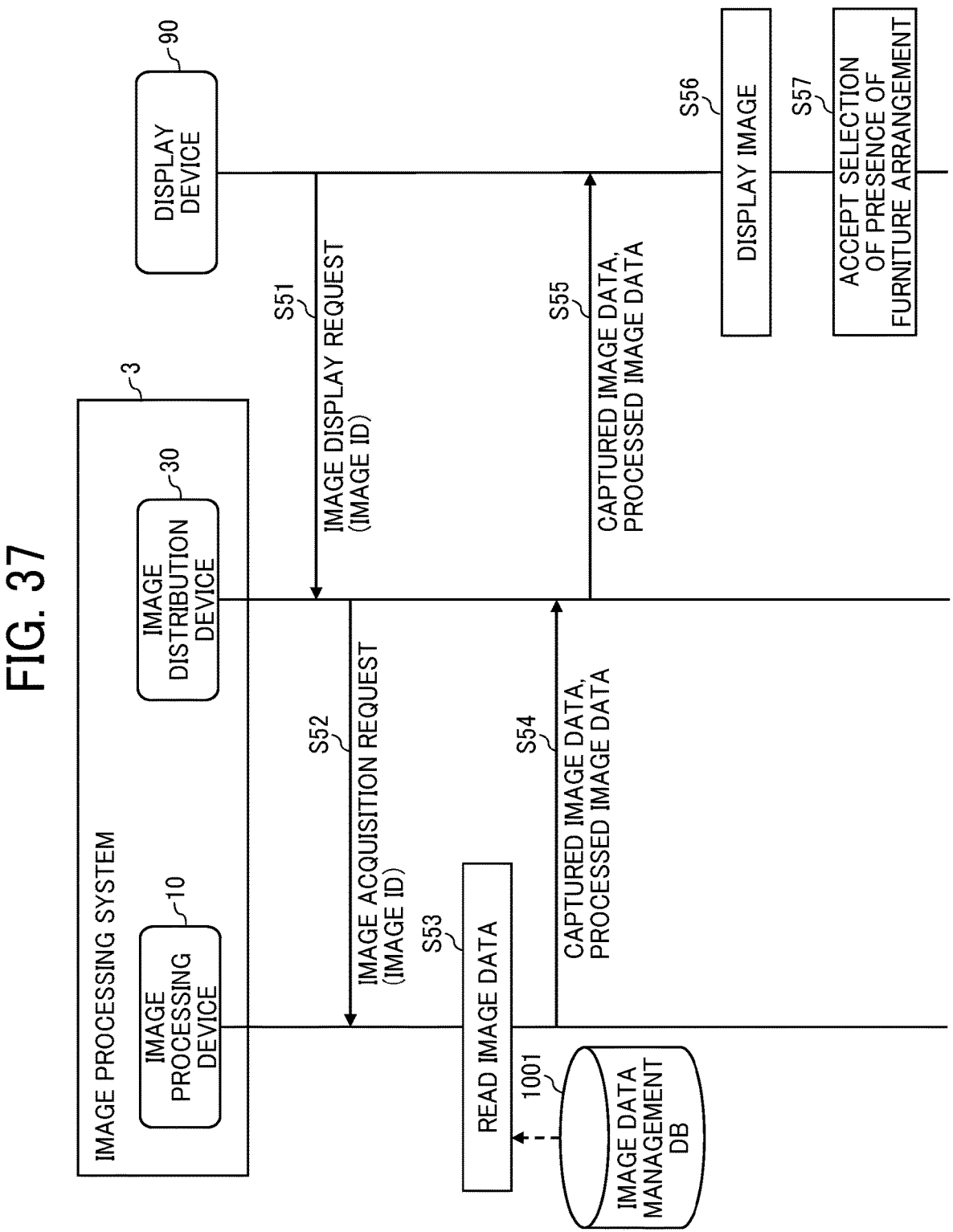
FIG. 37 is a sequence diagram presenting an example of an image display process.

Referring to FIGS. 37 to 43, an image display process by the image processing system 3 is described. FIG. 37 is a sequence diagram presenting an example of the image display process. FIG. 37 presents a process when the processed image data stored in the image processing device 10 through the above-described process is distributed to a viewer using the image distribution device 30.

The transmitting and receiving unit 91 of the display device 90 transmits an image display request indicative of requesting displaying of an image to the image distribution device 30 based on an input operation by a viewer on an input device or the like (step S51). The image display request includes an image ID for identifying an image in which a construction of a request target is captured. The transmitting and receiving unit 31 of the image distribution device 30 receives the image display request transmitted from the display device 90.

Then, the transmitting and receiving unit 31 of the image distribution device 30 transmits an image acquisition request indicative of requesting the image processing device 10 to acquire image data to be distributed to the display device 90 (step S52). The image acquisition request includes the image ID received in step S51. Accordingly, the transmitting and receiving unit 11 of the image processing device 10 receives the image acquisition request transmitted from the image distribution device 30.

Then, the storing and reading unit 29 of the image processing device 10 searches the image data management DB 1001 (see FIG. 14) while using the image ID received in step S52 as a search key. Thus, the storing and reading unit 29 reads captured image data and processed image data associated with the same image ID as the received image ID (step S54). The transmitting and receiving unit 11 transmits the captured image data and the processed image data read in step S54 to the image distribution device 30. Accordingly, the transmitting and receiving unit 31 of the image distribution device 30 receives the captured image data and the processed image data transmitted from the image processing device 10.

The display control unit 32 transmits (distributes) the received captured image data or processed image data to the display device 90 via the transmitting and receiving unit 31 to cause the display device 90 to display a captured image or a processed image (step S55). The display control unit 93 of the display device 90 causes the display 906 to display the captured image or processed image corresponding to the data transmitted (distributed) from the image distribution device 30 (step S56).

Figure 38A:
FIG. 38A illustrates a screen example of a captured image displayed on the display device.
Figure 38B:
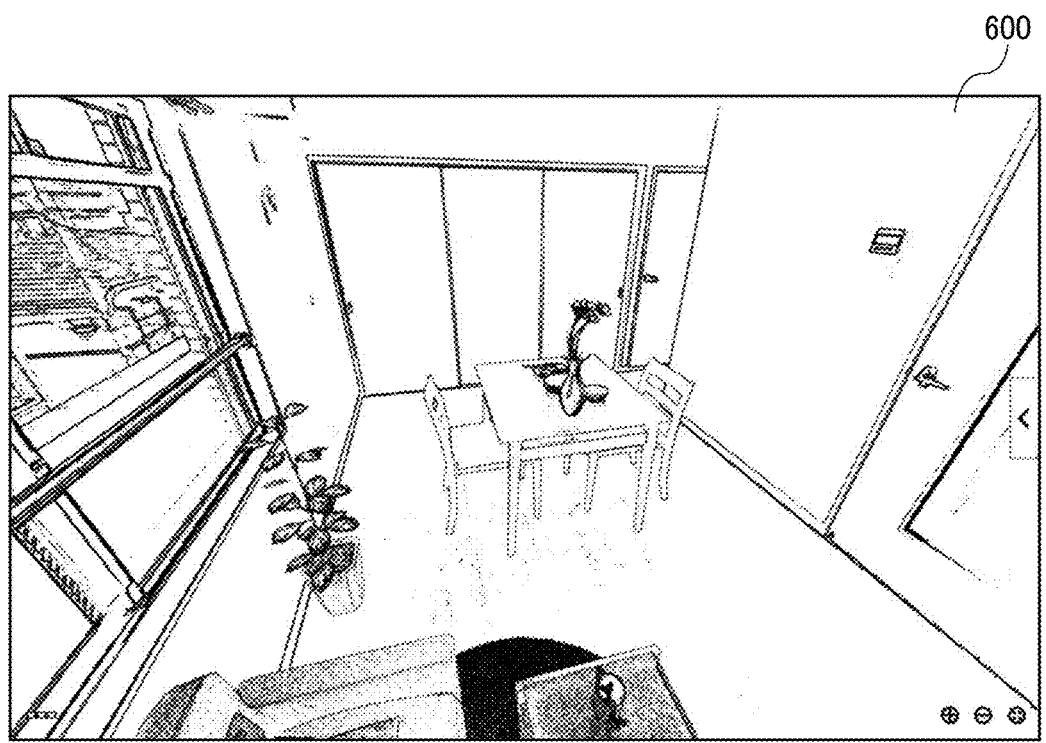
FIG. 38B illustrates a screen example of a processed image displayed on the display device.

FIG. 38A illustrates a screen example of a captured image displayed on the display device 90. FIG. 38B illustrates a screen example of a processed image displayed on the display device 90. A captured image 400 illustrated in FIG. 38A is an image presenting a state of a room before furniture is arranged. In contrast, a processed image 600 illustrated in FIG. 38B is an image presenting a state after furniture is arranged in the captured image 400 presented in FIG. 38A.

The acceptance unit 92 of the display device 90 accepts a selection of presence of furniture arrangement in response to a predetermined input operation using an input device of the display device 90 (step S57). Accordingly, a viewer can select presence of furniture arrangement in the image displayed on the display device 90. The viewer can view the state of the room before and after furniture is arranged by switching the image.

In this way, the image processing system 3 causes the display device 90 to display the processed image combined with the 3D model of the furniture. Accordingly, a more particular image of the room can be given to the viewer.

A process of displaying additional information corresponding to arranged furniture in a superimposed manner on the processed image 600 illustrated in FIG. 38B is described next with reference to FIGS. 39 to 41B. When the processed image 600 is displayed on the display device 90, the image distribution device 30 can display additional information on the image rendered with a furniture model arranged. Examples of the additional information include an icon that urges a viewer to pay attention, a link of a Web site to sell furniture, and explanation about furniture.

FIG. 39 conceptually presents an example of an additional information management table. As illustrated in FIG. 13, the memory 3000 includes an additional information management DB 3001 including the additional information management table illustrated in FIG. 39. The additional information management table manages, for each image ID for identifying image data, an additional ID for identifying additional information, the type of furniture, coordinate information indicative of an arrangement position of the additional information, and a link of a Web site in an associated manner. The coordinate position is calculated by the calculation unit 35 based on the coordinate position of the 3D model of the furniture corresponding to the additional information. The link of a Web site is included in, for example, furniture information transmitted from the above-described communication terminal 80.

Figure 40:
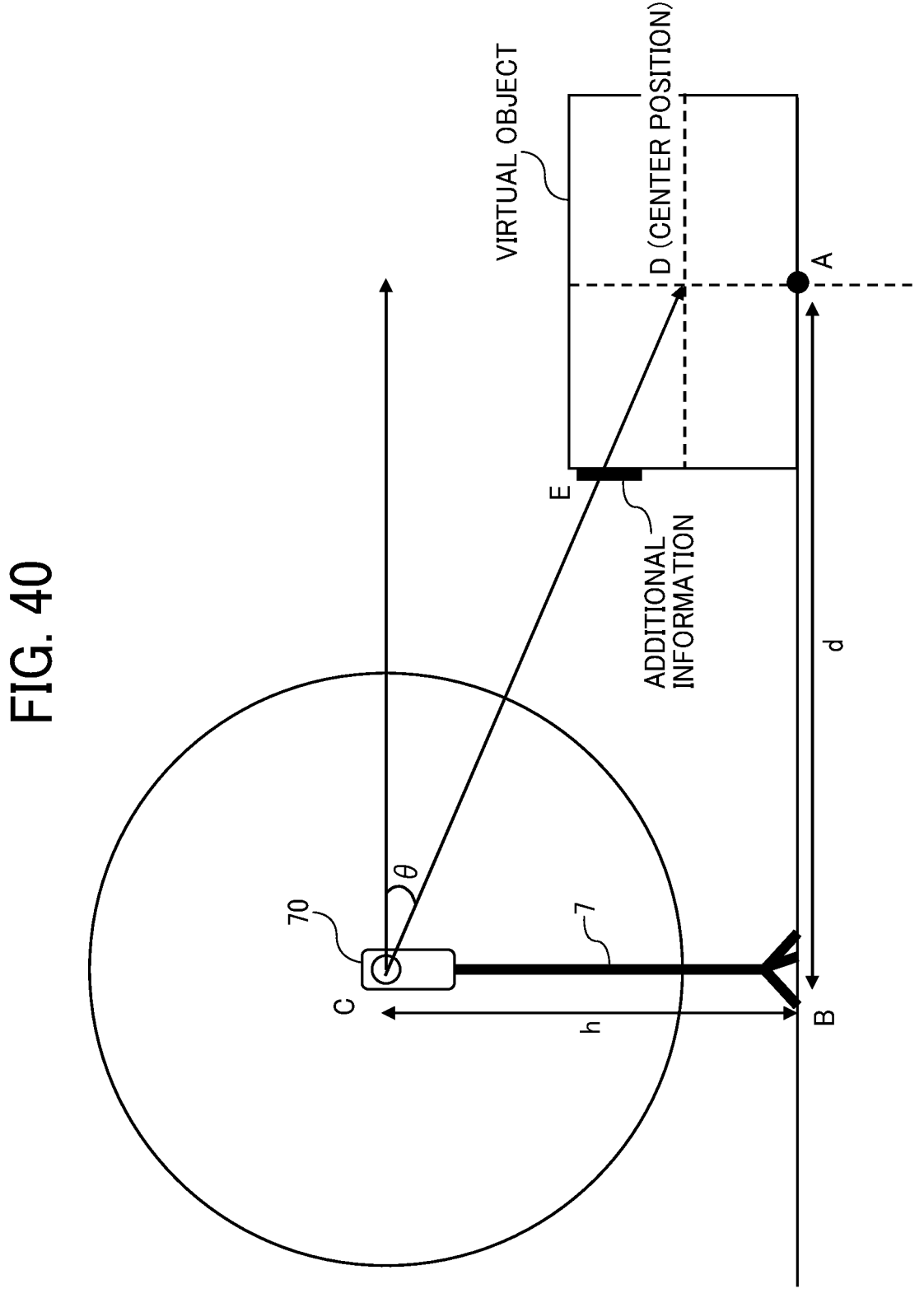
FIG. 40 illustrates an example of an arrangement position of additional information.

FIG. 40 illustrates an example of an arrangement position of additional information. When additional information such as written explanation, an icon, or a link is superimposed on a captured image, the additional information is required to be correctly superimposed on the position of the furniture. As illustrated in FIG. 40, the coordinate detection unit 34 detects the coordinates in the processed image of furniture appearing in the processed image. The calculation unit 35 calculates the coordinates of a center position D of furniture, and calculates a direction from the imaging device 70 toward the calculated center position D. The image processing unit 36 superimposes additional information corresponding to the furniture on the coordinate position on the processed image indicating the direction calculated by the calculation unit 35.

Examples of the additional information to be superimposed include an icon that urges a viewer to pay attention, explanation about furniture, and an image for accepting an access to a link of a Web site. For example, the image distribution device 30 executes a superimposition process of the above-described additional information when the transmitting and receiving unit 31 receives processed image data in step S54 illustrated in FIG. 36, and causes the display device 90 to display a processed image on which the additional information is superimposed in step S55.

Figure 41A:
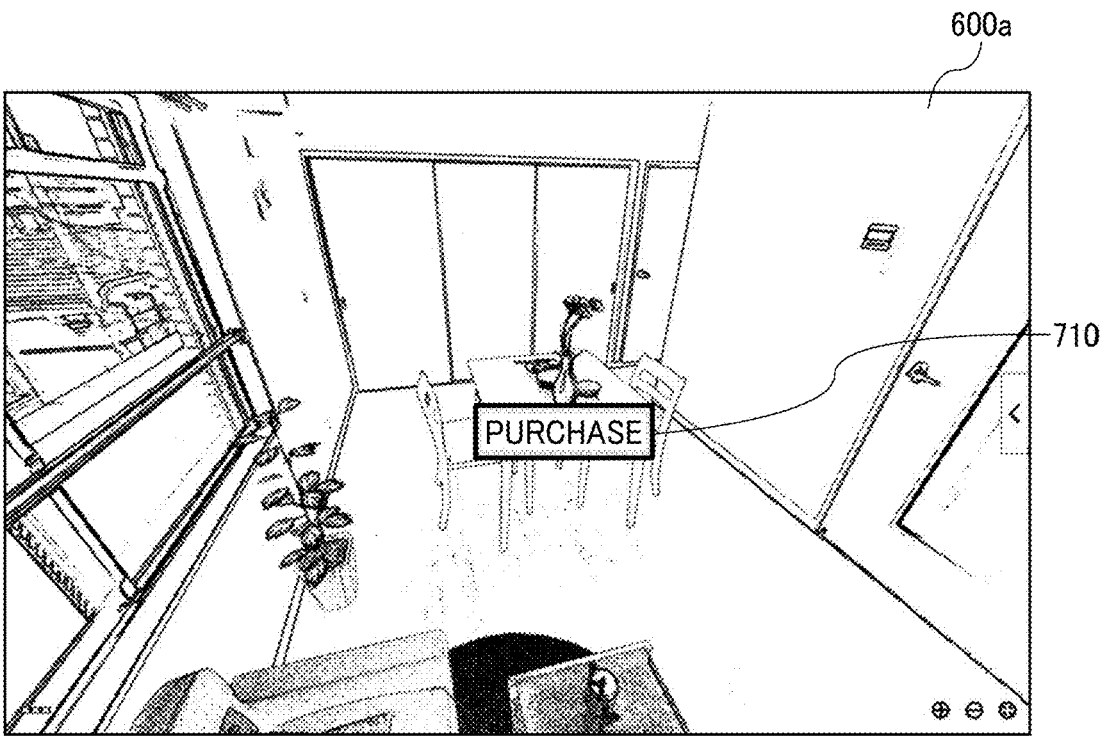
FIG. 41A illustrates a screen example of a processed image on which additional information is superimposed.
Figure 41B:
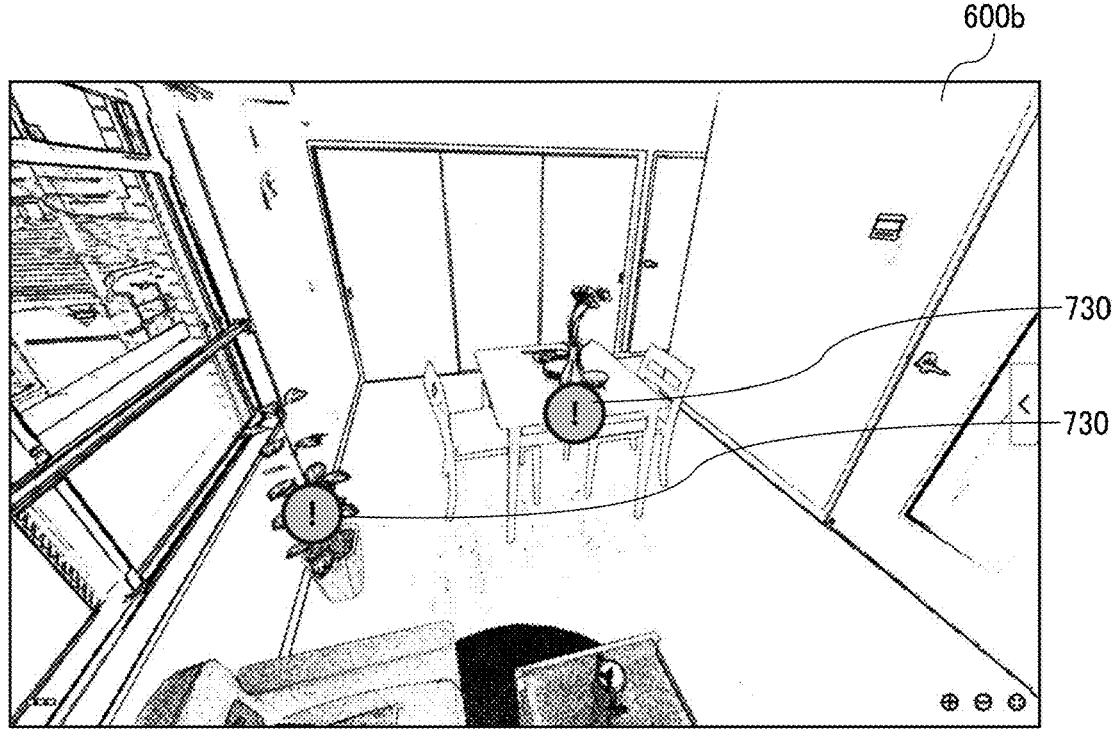
FIG. 41B illustrates another screen example of a processed image on which additional information is superimposed.

FIGS. 41A and 41B illustrate screen examples of processed images on which additional information is superimposed. In a processed image 600a illustrated in FIG. 41A, an image 710 is displayed as additional information. The image 710 is for accepting an access to a Web site corresponding to furniture appearing in the processed image 600a. The image 710 includes, for example, a link to a Web site such as an electronic commerce (EC) through which the furniture appearing in the processed image 600a can be purchased. A viewer who views the processed image 600a displayed on the display device 90 can make an access to the corresponding page of the EC site by pressing the image 710.

In a processed image 600b illustrated in FIG. 41B, an icon 730 is displayed as additional information. The icon 730 indicates that the furniture appearing in the processed image 600a is a combined image. When an image of a virtual object is combined using ray tracing or image based lighting technique, it may be difficult for a viewer to figure out which part of the processed image is CG. Hence, in the processed image 600b, the icon 730 that urges the viewer to pay attention is displayed on the combined image of the furniture. Accordingly, the viewer can clearly distinguish an object fitted in the room from a combined object.

The icon 730 may be hidden after a certain period of time elapses instead of being constantly displayed, or displaying and non-displaying of the icon 730 may be switched in response to an input operation by the viewer. Moreover, an effect may be added to the icon 730 so as to blink to urge the viewer to pay more attention. Furthermore, the processed image 600b may indicate explanation about the furniture when the viewer selects the icon 730.

Figure 42:
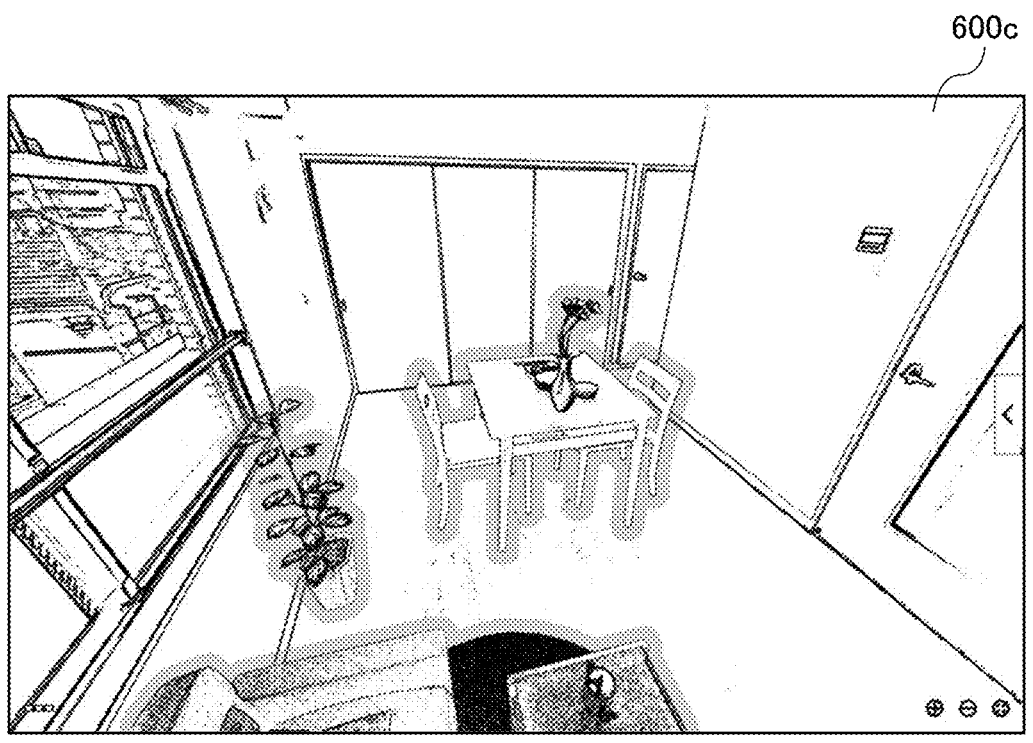
FIG. 42 illustrates another example of a processed image displayed on the display device.

Application examples of processed images displayed on the display device 90 are described next with reference to FIGS. 42 and 43. A processed image 600c illustrated in FIG. 42 presents a state in which the edge of an image of arranged furniture is enhanced. For example, when the transmitting and receiving unit 31 receives processed image data in step S54 illustrated in FIG. 36, the image processing unit 36 of the image distribution device 30 generates a combined image to enhance the edge of the image of the furniture, and causes the display device 90 to display the generated processed image 600c. Accordingly, the viewer of the processed image 600c can clearly recognize the portion of the combined virtual object (furniture).

Figure 43:
FIG. 43 illustrates another example of a processed image displayed on the display device.

A processed image 600d illustrated in FIG. 43 presents a state in which the color rating of an image of arranged furniture is changed. For example, when the transmitting and receiving unit 31 receives processed image data in step S54 illustrated in FIG. 36, the image processing unit 36 of the image distribution device 30 executes a process of changing the color rating of the image of the furniture and causes the display device 90 to display the processed image 600d. Accordingly, the viewer of the processed image 600c can clearly recognize the portion of the combined virtual object (furniture) by viewing the image in which the color rating is changed and hence is intentionally unnatural.

As described above, the image display system 1 estimates the structure of a room and the position of a subject using a captured image captured by the imaging device 70, and arranges a 3D model of furniture in an arrangement allowable region corresponding to the estimated result. Thus, a virtual object can be more naturally arranged.

Moreover, the image display system 1 causes the display device 90 to display a processed image with a 3D model of furniture combined by the image processing system 3. Hence, the viewer of the image can view a state of an empty room and a state of the room arranged with furniture. The viewer can obtain more particular image of the room.

As described above, an image processing method according to an embodiment of the disclosure is an image processing method to be executed by an image processing system 3. The image processing method includes estimating a structure of a space (for example, room) inside a construction from a background image (for example, spherical image) in which the space is imaged in all directions; estimating a region in which a virtual object (for example, 3D model of furniture) is allowed to be arranged in the space based on the estimated structure; and combining the virtual object with the background image in the estimated region. Accordingly, the image processing method can automatically arrange the virtual object at an appropriate position in the space inside the construction.

The image processing method according to an embodiment of the disclosure further includes detecting a subject appearing in the background image (for example, spherical image); and estimating a position of the detected subject in the space. The estimating the region estimates the region based on the estimated structure of the space and the estimated position of the subject. Accordingly, the image processing method can estimate the state of the space by estimating the structure of the space appearing in the background image and detecting the subject. Moreover, the image processing method can estimate a position at which the subject is possibly fitted in the structure of the space by detecting the subject based on the estimated structure of the space. Thus, processing efficiency can be increased.

In the image processing method according to an embodiment of the disclosure, the image processing system 3 includes a condition information management DB 1002 (example of storage unit) configured to store condition information indicative of an arrangement condition of a virtual object (for example, 3D model of furniture). The image processing method executed by the image processing system 3 includes determining to select the virtual object corresponding to a purpose of the space (for example, room) inside the construction from the stored condition information. Accordingly, the image processing method can automatically arrange the virtual object suitable for the purpose in accordance with the purpose of the space appearing in the background image.

An image processing system according to an embodiment of the disclosure includes a structure estimation unit 14 (example of structure estimator) configured to estimate a structure of a space (for example, room) inside a construction from a background image (for example, spherical image) in which the space is imaged in all directions; a region estimation unit 17 (example of region estimator) configured to estimate a region in which a virtual object (for example, 3D model of furniture) is allowed to be arranged in the space based on the estimated structure; and an image processing unit 20 (example of image processor) configured to combine the virtual object with the background image in the estimated region. Accordingly, the image processing system 3 can automatically arrange the virtual object at an appropriate position in the space inside the construction.

The image processing system according to an embodiment of the disclosure further includes a display control unit 32 (example of display controller) configured to cause a display device 90 to display a processed image combined by the image processing unit 20 (example of image processor). Accordingly, the image processing system 3 can switch the image to allow a viewer to view the state of the space before and after the virtual object is arranged.

Each of the functions of the described embodiments may be implemented by one or more processing circuits or circuitry. The "processing circuits or circuitry" in the embodiments includes a processor programmed to execute the functions using software like a processor mounted as an electronic circuit. The "processing circuits or circuitry" in the embodiments also includes devices such as an application specific integrated circuit (ASIC), a digital signal processor (DSP), a field programmable gate array (FPGA), a system on a chip (SOC), a graphics processing unit (GPU), and conventional circuit components designed to perform the functions.

Various tables of the above-described embodiments may be generated through a learning effect of machine learning, or a table does not have to be used but data of respective associated items are classified through machine learning. Machine learning is a technology for allowing a computer to obtain learning ability like a human. The technology autonomously generates an algorithm required for a computer to make determination such as identification of data from learning data acquired in advance, applies the algorithm to new data, and performs prediction. The learning method for machine learning may be one of learning methods of supervised learning, unsupervised learning, semi-supervised learning, reinforcement learning, and deep learning; or a combination of at least two of the above-listed learning methods. The learning method for machine learning is not limited.

While the image processing method, the program, and the image processing system according to the embodiments of the disclosure have been described, the disclosure is not limited to the embodiments described above, and modifications such as adding another embodiment, changing an embodiment, or deleting an embodiment may be made so long as such modifications can be made by a person skilled in the art, and any aspect that achieves the operations and advantageous effects of the disclosure is included in the scope of the disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a TCP/IP signal carrying computer code over an IP network, such as the Internet. The carrier medium may also include a storage medium for storing processor readable code such as a floppy disk, hard disk, CD ROM, magnetic tape device or solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. This patent application is based on and claims priority to Japanese Patent Application No. 2020-187839, filed on Nov. 11, 2020 in the Japan Patent Office, the entire disclosure of which is hereby incorporated by reference herein.

REFERENCE SIGNS LIST

1 Image display system
3 Image processing system
5 Communication network
7 Support
10 Image processing device
11 Transmitting and receiving unit
14 Structure estimation unit (example of structure estimator)
15 Detection unit
16 Position estimation unit
17 Region estimation unit (example of region estimator)
18 Second determination unit
19 Arrangement unit
20 Image processing unit (example of image processor)
30 Image distribution device
31 Transmitting and receiving unit
32 Display control unit (example of display controller)
35 Calculation unit (example of calculator)
70 Imaging device
80 Communication terminal
90 Display device
1002 Condition information management DB (example of storage unit)

The invention claimed is:

1. An image processing method, comprising:
estimating a structure of a space inside a construction from a background image in which the space is imaged in all directions;
detecting a subject appearing in the background image and a three-dimensional (3D) position of an imaging device which captured the background image, the subject including a fixed structural component of the construction;
estimating a 3D position of the subject in the space;
estimating, based on the structure of the space, the 3D position of the subject, information of the subject and information of a virtual object to be placed:
an arrangement allowable region, in which the virtual object is allowed to be arranged in the space, by generating a 3D space model based on the estimated structure of the space, calculating distances between potential placement positions and detected subject positions in the 3D space model, and identifying positions that satisfy predetermined distance thresholds from the 3D position of the subject and from other objects as the arrangement allowable region;
an arrangement prohibited region, in which the virtual object is prohibited from being arranged in the space, by defining a 3D coordinate region in the 3D space model that includes the 3D position of the imaging device, expanding the 3D coordinate region to include a predetermined radius around the imaging device position, and designating the expanded coordinate region as unavailable for virtual object placement; and
combining the virtual object with the background image in the arrangement allowable region, and not in the arrangement prohibited region, to generate a staged image including the virtual object in the space.

2. The image processing method according to claim 1, wherein
the detecting detects a type of the subject, and
the information of the subject includes the detected type of the subject.

3. The image processing method according to claim 1, wherein
the detecting detects a support supporting an imager configured to image the space, and
the combining combines a predetermined image with the background image to generate the staged image, and
the staged image hides the detected support.

4. The image processing method according to claim 1, wherein
when the subject includes a particular subject serving as a light source in the background image, the detecting detects the particular subject,
the estimating the 3D position estimates a position of the detected particular subject in the space, and
the combining combines an image, indicative of a virtual light source, at the 3D position in the space of the particular subject estimated in the estimating the 3D position.

5. The image processing method according to claim 1, wherein the estimating the structure estimates a size of the space.

6. The image processing method according to claim 1, wherein
the estimating the structure estimates a purpose of the space,
the image processing method further comprises determining the virtual object based on the purpose, and
the combining combines the virtual object with the background image to generate the staged image.

7. The image processing method according to claim 1, further comprising:
receiving purpose information, indicative of a purpose of the space, from an external device; and
determining the virtual object based on the received purpose information, wherein
the combining combines the determined virtual object with the background image to generate the staged image.

8. The image processing method according to claim 6, wherein the determining selects the virtual object corresponding to the purpose of the space from condition information indicative of an arrangement condition of a virtual object stored in a memory of an image processing system.

9. The image processing method according to claim 1, further comprising:
arranging the virtual object in the arrangement allowable region, wherein the combining combines the arranged virtual object with the background image in the arrangement allowable region.

10. A non-transitory computer readable recording medium to cause a computer to execute the image processing method comprising:

estimating a structure of a space inside a construction from a background image in which the space is imaged in all directions;

detecting a subject appearing in the background image and a three-dimensional (3D) position of an imaging device which captured the background image, the subject including a fixed structural component of the construction;

estimating a 3D position of the subject in the space;

estimating, based on the structure of the space, the 3D position of the subject, information of the subject and information of a virtual object to be placed:

an arrangement allowable region, in which the virtual object is allowed to be arranged in the space, by generating a 3D space model based on the estimated structure of the space, calculating distances between potential placement positions and detected subject positions in the 3D space model, and identifying positions that satisfy predetermined distance thresholds from the 3D position of the subject and from other objects as the arrangement allowable region;

an arrangement prohibited region, in which the virtual object is prohibited from being arranged in the space, by defining a 3D coordinate region in the 3D space model that includes the 3D position of the imaging device, expanding the 3D coordinate region to include a predetermined radius around the imaging device position, and designating the expanded coordinate region as unavailable for virtual object placement; and combining the virtual object with the background image in the arrangement allowable region, and not in the arrangement prohibited region, to generate a staged image including the virtual object in the space.

11. An image processing system, comprising:
circuitry configured to estimate a structure of a space inside a construction from a background image in which the space is imaged in all directions;

detect a subject appearing in the background image and a three-dimensional (3D) position of an imaging device which captured the background image, the subject including a fixed structural component of the construction;

estimate a 3D position of the subject in the space;

estimate, based on the structure of the space, the 3D position of the subject, information of the subject and information of a virtual object to be placed:

an arrangement allowable region, in which the virtual object is allowed to be arranged in the space, by generating a 3D space model based on the estimated structure of the space, calculating distances between potential placement positions and detected subject positions in the 3D space model, and identifying positions that satisfy predetermined distance thresholds from the 3D position of the subject and from other objects as the arrangement allowable region;

an arrangement prohibited region, in which the virtual object is prohibited from being arranged in the space, by defining a 3D coordinate region in the 3D space model that includes the 3D position of the imaging device, expanding the 3D coordinate region to include a predetermined radius around the imaging device position, and designating the expanded coordinate region as unavailable for virtual object placement; and combine the virtual object with the background image in the arrangement allowable region, and not in the arrangement prohibited region, to generate a staged image including the virtual object in the space.

12. The image processing system according to claim 11, wherein the circuitry is further configured to control a display to display the staged image.

13. The image processing system according to claim 12, wherein the circuitry controls the display to switch display between the background image and the staged image.

14. The image processing system according to claim 12, wherein the circuitry is further configured to calculate a center position of the virtual object in the staged image, and control the display to display additional information in a superimposed manner at the calculated center position on the staged image.

15. The image processing system according to claim 14, wherein the additional information is one of an icon corresponding to the virtual object and a link to a Web site.

16. The image processing system according to claim 12, wherein the circuitry is further configured to control the display to display an image which is one of a color image of the virtual object appearing in the staged image and an edge image in which an edge of the virtual object appearing in the staged image is enhanced.

17. The image processing method according to claim 1, wherein the structure of the space indicates dimensions of the space, the 3D position of the subject indicates a coordinate position of the subject within the dimensions of the space, the information of the subject indicates dimensions of the subject, and the information of the virtual object indicates virtual dimensions of the object to be placed.

18. The image processing method according to claim 17, wherein in a case that the virtual object is furniture, the arrangement allowable region is estimated to be a first threshold distance away from the subject and a second threshold distance away from other objects already within the space, and in a case that the virtual object is a rug, the arrangement allowable region is estimated to overlap with other objects already within the space.

* * * * *